United States Patent
Noda et al.

(10) Patent No.: US 10,963,826 B2
(45) Date of Patent: Mar. 30, 2021

(54) WORK PLANNING SYSTEM, WORK PLANNING METHOD, DECISION-MAKING SUPPORT SYSTEM, COMPUTER PROGRAM, AND STORAGE MEDIUM

(71) Applicant: MITSUBISHI HEAVY INDUSTRIES, LTD., Tokyo (JP)

(72) Inventors: Eisuke Noda, Tokyo (JP); Satoshi Hanada, Tokyo (JP); Yusuke Yamada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 101 days.

(21) Appl. No.: 15/562,888

(22) PCT Filed: Mar. 25, 2016

(86) PCT No.: PCT/JP2016/059752
§ 371 (c)(1),
(2) Date: Sep. 28, 2017

(87) PCT Pub. No.: WO2016/158801
PCT Pub. Date: Oct. 6, 2016

(65) Prior Publication Data
US 2018/0114176 A1    Apr. 26, 2018

(30) Foreign Application Priority Data
Mar. 31, 2015   (JP) .............................. JP2015-073942

(51) Int. Cl.
*G06Q 10/06*   (2012.01)
*G06Q 50/06*   (2012.01)

(52) U.S. Cl.
CPC .  *G06Q 10/063114* (2013.01); *G06Q 10/0635* (2013.01); *G06Q 50/06* (2013.01); *G06Q 10/0633* (2013.01); *G06Q 10/06316* (2013.01)

(58) Field of Classification Search
CPC ....... G06Q 10/063114; G06Q 10/0635; G06Q 50/06; G06Q 10/06316; G06Q 10/0633
See application file for complete search history.

(56) References Cited

U.S. PATENT DOCUMENTS 5,812,622 A * 9/1998 Chang ...................... G21D 3/00
376/259
8,838,509 B1 * 9/2014 Shah ...................... G06Q 10/10
706/12

(Continued)

FOREIGN PATENT DOCUMENTS

| GB | 2513457 A | 10/2014 |
|---|---|---|
| JP | 10-334078 A | 12/1998 |

(Continued)

OTHER PUBLICATIONS

Office Action in JP Application No. 2017-509937, dated Oct. 2, 2018, 7pp.

(Continued)

*Primary Examiner* — Sujay Koneru
(74) *Attorney, Agent, or Firm* — Hauptman Ham, LLP

(57) ABSTRACT

A work planning system includes an event-data acquisition unit that acquires event data indicating an event of a facility, a storage unit that stores therein a plurality of pieces of work data indicating contents of works that can be performed with respect to the facility, and a decision unit that decides each importance degree of a plurality of pieces of work data based on the event data.

9 Claims, 12 Drawing Sheets

(56) References Cited

U.S. PATENT DOCUMENTS

| | | | | |
|---|---|---|---|---|
| 2002/0054101 A1* | 5/2002 | Beatty | G06Q 10/06 | 715/764 |
| 2002/0116242 A1* | 8/2002 | Vercellone | G06Q 10/06311 | 705/7.13 |
| 2002/0169658 A1* | 11/2002 | Adler | G06Q 10/06 | 705/7.28 |
| 2005/0027571 A1* | 2/2005 | Gamarnik | G06Q 40/08 | 705/4 |
| 2005/0192696 A1* | 9/2005 | Utaka | G05B 23/0213 | 700/116 |
| 2006/0041447 A1* | 2/2006 | Vucina | G06Q 10/06 | 705/7.21 |
| 2007/0005680 A1* | 1/2007 | Jrad | G06Q 10/00 | 709/201 |
| 2007/0033095 A1* | 2/2007 | Hodgin | G06Q 10/063 | 705/7.28 |
| 2007/0061180 A1* | 3/2007 | Offenberg | G06Q 10/06 | 705/7.22 |
| 2007/0073575 A1* | 3/2007 | Yomogida | G06Q 10/063114 | 705/7.15 |
| 2008/0133300 A1* | 6/2008 | Jalinous | G06Q 10/0635 | 705/7.28 |
| 2008/0172262 A1* | 7/2008 | An | G06Q 10/0637 | 705/7.37 |
| 2008/0221965 A1* | 9/2008 | Riddle | G06Q 10/06 | 705/7.19 |
| 2009/0325538 A1* | 12/2009 | Sennett | H04W 4/90 | 455/404.2 |
| 2011/0022879 A1* | 1/2011 | Chavda | G06F 11/0793 | 714/1 |
| 2011/0166900 A1* | 7/2011 | Miranda | G06Q 10/06 | 705/7.11 |
| 2011/0270767 A1* | 11/2011 | Hamilton | G06Q 10/103 | 705/301 |
| 2012/0041575 A1* | 2/2012 | Maeda | G05B 23/024 | 700/80 |
| 2012/0209654 A1* | 8/2012 | Romagnino | G06Q 10/06 | 705/7.27 |
| 2012/0316835 A1 | 12/2012 | Maeda et al. | | |
| 2013/0234436 A1* | 9/2013 | Kii | F03D 7/028 | 290/44 |
| 2013/0239040 A1* | 9/2013 | Kaleta | G06F 3/0484 | 715/772 |
| 2013/0300758 A1* | 11/2013 | Yerli | G06T 11/206 | 345/581 |
| 2014/0019795 A1 | 1/2014 | Sonoda et al. | | |
| 2014/0064426 A1 | 3/2014 | Hess et al. | | |
| 2014/0078882 A1* | 3/2014 | Maltz | H04L 41/145 | 370/216 |
| 2014/0167953 A1* | 6/2014 | Dunlop | G09B 19/00 | 340/515 |
| 2014/0172481 A1* | 6/2014 | Godwin | G06Q 10/063 | 705/7.15 |
| 2014/0229480 A1* | 8/2014 | Buxbaum | G06F 16/254 | 707/736 |
| 2014/0278306 A1* | 9/2014 | Taghavi | G06Q 40/08 | 703/6 |
| 2014/0350996 A1* | 11/2014 | Iwatsuki | G06Q 10/06316 | 705/7.26 |
| 2014/0365191 A1* | 12/2014 | Zyglowicz | G06Q 10/20 | 703/7 |
| 2015/0025933 A1* | 1/2015 | Andelman | G06Q 10/0635 | 705/7.28 |
| 2015/0120359 A1* | 4/2015 | Dongieux | G06F 16/285 | 705/7.15 |
| 2015/0142508 A1* | 5/2015 | Buck | G06Q 10/0635 | 705/7.28 |
| 2015/0254159 A1* | 9/2015 | Kobayashi | G06F 11/3495 | 714/748 |
| 2015/0286819 A1* | 10/2015 | Coden | H04L 63/1425 | 726/23 |
| 2016/0036931 A1* | 2/2016 | Mathis | H04L 67/22 | 709/224 |
| 2016/0089572 A1* | 3/2016 | Liu | G06K 9/00342 | 434/255 |
| 2016/0247246 A1* | 8/2016 | Bluestone | G06F 11/1458 | |
| 2016/0281607 A1* | 9/2016 | Asati | F02C 6/18 | |
| 2016/0329117 A1* | 11/2016 | Noda | G05B 23/0272 | |

FOREIGN PATENT DOCUMENTS

| | | |
|---|---|---|
| JP | 2003-57381 A | 2/2003 |
| JP | 2005-71200 A | 3/2005 |
| JP | 2008-172406 A | 7/2008 |
| JP | 2011-145846 A | 7/2011 |
| JP | 2013-88829 A | 5/2013 |
| JP | 2014-237071 A | 12/2014 |
| WO | 2009/136230 A2 | 11/2009 |
| WO | 2012/127588 A1 | 7/2014 |

OTHER PUBLICATIONS

Extended European Search Report in EP Application No. 16772682.7, dated Jan. 12, 2018. 9pp.

International Search Report in PCT/JP2016/059752, dated Jun. 14, 2016, 6pp.

Written Opinion of the ISA in PCT/JP2016/059752, dated Jun. 14, 2016, 10pp.

* cited by examiner

WORK PLANNING SYSTEM, WORK PLANNING METHOD, DECISION-MAKING SUPPORT SYSTEM, COMPUTER PROGRAM, AND STORAGE MEDIUM

RELATED APPLICATIONS

The present application is a National Phase of International Application Number PCT/JP2016/059752, filed Mar. 25, 2016, which claims priority to JP 2015-073942 filed Mar. 31, 2015.

FIELD

The present invention relates to a work planning system, a work planning method, a decision-making support system, a computer program, and a storage medium.

BACKGROUND

If a disaster such as a severe accident in a nuclear power generation plant occurs, a disaster response office is established in parties concerned to take measures. If a disaster occurs, there is a case where a decision-making support system is used to support decision making of the measures. Examples of a decision-making support system are disclosed in Patent Literature 1 and Patent Literature 2. An example of an image processing apparatus that transmits information at the time of occurrence of a disaster is disclosed in Patent Literature 3.

CITATION LIST

Patent Literatures

Patent Literature 1: Japanese Laid-open Patent Publication No. 2013-088829 A
Patent Literature 2: Japanese Laid-open Patent Publication No. 10-334078 A
Patent Literature 3: Japanese Laid-open Patent Publication No. 2008-172406 A

SUMMARY

Technical Problem

Various events occur in a plant due to occurrence of a disaster. Works based on the measures decided against such events are performed. When the works with respect to the measures are not performed appropriately, there is a possibility that the damage of the disaster increases. Further, not only in plant facilities but, for example, in traffic facilities such as motorways or railways, or building facilities such as condominium buildings or commercial facilities, when a disaster occurs, it is necessary to appropriately perform works with respect to the measures against the event of the facilities.

According to an aspect of the present invention, it is an object thereof to provide a work planning system that can appropriately plan works with respect to measures against events of facilities in case of abnormalities such as occurrence of a disaster, a work planning method, a computer program, and a recording medium. Further, an aspect of the present invention is to provide a decision-making support system that can effectively support decision making by using data on planned works.

Solution to Problem

According to a first aspect of the present invention, a work planning system is provided and includes an event-data acquisition unit that acquires event data indicating an event of a facility, a storage unit that stores therein a plurality of pieces of work data indicating contents of works that can be performed with respect to the facility, and a decision unit that decides each importance degree of a plurality of pieces of work data based on the event data.

According to the first aspect of the present invention, by deciding each importance degree of a plurality of pieces of work data based on event data, it is possible to appropriately plan works with respect to measures against an event of a facility.

In the first aspect of the present invention, the event data may include scenario data indicating an estimated event of the facility.

Accordingly, the importance degrees of works that are estimated to be performed in the future can be smoothly recognized, and it is possible to appropriately plan works.

In the first aspect of the present invention, a display control unit that causes a display device to display the plurality of pieces of work data while associating these pieces of work data with importance degree data indicating the importance degree may be provided.

Accordingly, it is possible to appropriately plan works with respect to measures against an event of a facility based on a display result that is displayed as work data is associated with importance degree data indicating the importance degree.

In the first aspect of the present invention, a progress-data acquisition unit that acquires progress data indicating each progress status of the plurality of works may be provided. The display control unit may cause the display device to display the work data and the importance degree data while associating these pieces of data with the progress data.

Accordingly, not only importance degrees of works but also a progress status of the works can be smoothly recognized, and it is possible to appropriately plan the works.

In the first aspect of the present invention, an estimation unit that estimates a scheduled end time of the work based on the progress data may be provided. The display control unit may cause the display device to display time data indicating the scheduled end time.

Accordingly, because a scheduled end time of a certain work is recognized, it is possible to appropriately plan the next work.

In the first aspect of the present invention, a work-status-data acquisition unit that acquires work status data indicating whether each of the plurality of works is being performed normally may be provide. The display control unit may cause the display device to display work data of a work being performed normally and work data of a work not being performed normally with a mutually different design.

Accordingly, because the progress status of each work is recognized, it is possible to appropriately plan works.

According to a second aspect of the present invention, a decision-making support system that supports decision making of measures in case of emergency is provided and includes the work planning system according to the first aspect, and an information management unit that shares, via a network, abnormal condition data that is required in case of abnormalities and includes the work data associated with the importance degree data.

According to the second aspect of the present invention, because abnormal condition data including work data is shared by parties concerned, it is possible to effectively support decision making by using the abnormal condition data.

In the second aspect of the present invention, the abnormal condition data may be data having been changed at a change rate exceeding a reference value set in advance.

According to a third aspect of the present invention, a work planning method is provided and includes acquiring event data indicating an event of a facility, acquiring a plurality of pieces of work data indicating contents of works that can be performed with respect to the facility, deciding each importance degree of a plurality of pieces of work data based on the event data, and causing a display device to display the plurality of pieces of work data while associating these pieces of work data with importance degree data indicating the importance degree.

According to a fourth aspect of the present invention, a computer program is provided and causes a computer to execute acquiring event data indicating an event of a facility, acquiring a plurality of pieces of work data indicating contents of works that can be performed with respect to the facility, and deciding each importance degree of a plurality of pieces of work data based on the event data.

According to a fifth aspect of the present invention, a recording medium having recorded therein a computer program is provided and causes a computer to execute acquiring event data indicating an event of a facility, acquiring a plurality of pieces of work data indicating contents of works that can be performed with respect to the facility, and deciding each importance degree of a plurality of pieces of work data based on the event data.

Advantageous Effects of Invention

According to the aspect of the present invention, a work planning system that can appropriately plan works with respect to measures against events of facilities in case of abnormalities such as occurrence of a disaster, a work planning method, a computer program, and a recording medium are provided. Further, according to the aspect of the present invention, a decision-making support system that can effectively support decision making by using data with respect to planned works is provided.

DESCRIPTION OF EMBODIMENTS

Embodiments of the present invention will be described below with reference to the accompanying drawings; however, the present invention is not limited thereto. Constituent elements in the respective embodiments described below can be combined with each other as appropriated. In addition, some of the constituent elements may not be used.

First Embodiment

Figure 1:
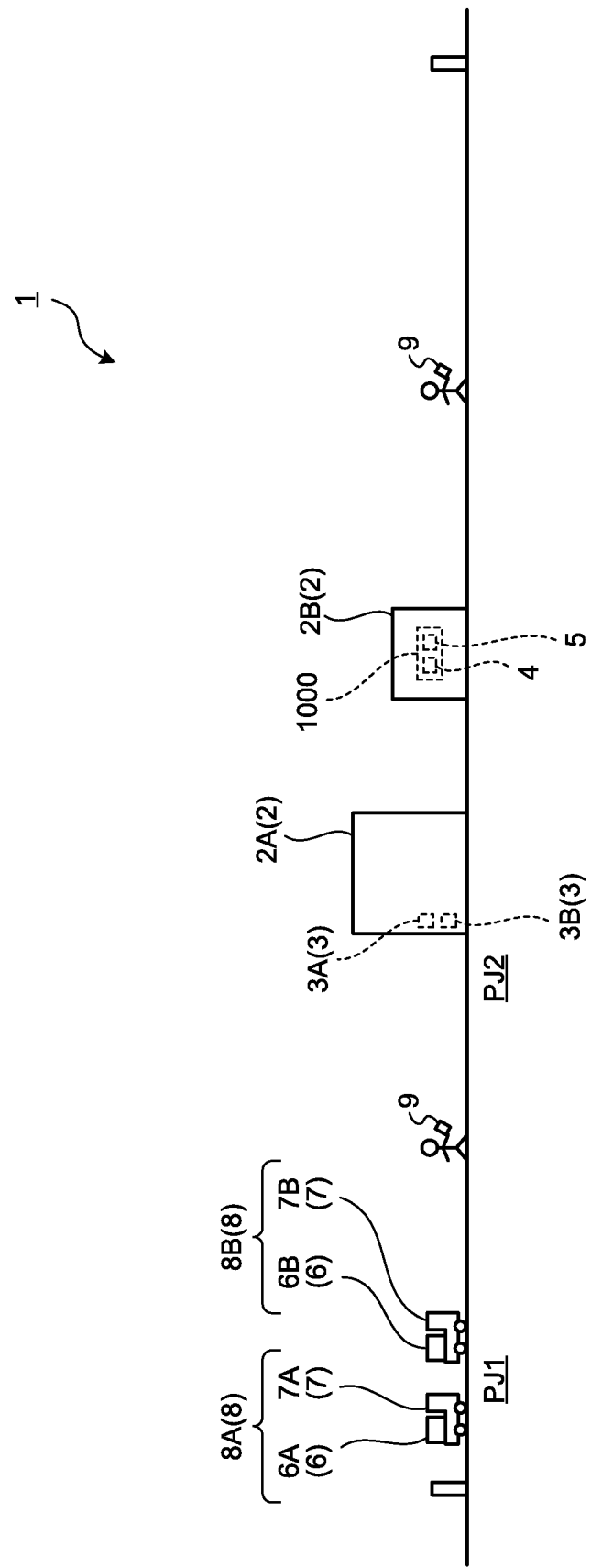
FIG. 1 is a diagram schematically illustrating an example of a plant according to a first embodiment.

A first embodiment is described. FIG. 1 is a diagram schematically illustrating an example of a plant 1 according to the present embodiment. In the present embodiment, the plant 1 is a nuclear power generation plant that generates power by using nuclear power. The plant 1 includes a nuclear reactor system including a nuclear reactor, and a turbine system including a steam turbine and a power generator. The nuclear reactor is a light-water reactor using light water as a reactor core coolant and a neutron moderator. The nuclear reactor system includes a primary coolant system in which primary cooling water circulates. The turbine system includes a secondary coolant system in which secondary cooling water circulates. The nuclear reactor system (primary coolant system) and the turbine system (secondary coolant system) are separated by a steam generator. The nuclear reactor system includes a pressurized water reactor (PWR) that generates high-temperature and high-pressure primary cooling water (hot water), and supplies the hot water to the steam generator to generate steam of the secondary cooling water by performing heat exchange between the primary cooling water (hot water) and the secondary cooling water in the steam generator. In the present embodiment, the nuclear power generation plant is a pressurized-water nuclear power generation plant.

The nuclear reactor system heats the primary cooling water by thermal energy generated by a nucleus reaction in a state in which the primary cooling water is pressurized to increase a boiling point of the primary cooling water. The nuclear reactor system generates high-temperature and high-pressure hot water by heating the pressurized water, and supplies the hot water to the steam generator. In the nuclear reactor system, the primary cooling water is heated so as not to be boiled. The turbine system converts the secondary cooling water to high-temperature and high-pressure steam by performing heat exchange between the secondary cooling water and the primary cooling water (hot water). The steam turbine is operated by the steam. The power generator is operated by the operation of the steam turbine to generate power.

A plurality of constructions 2 are placed in a property of the plant 1. The construction 2 includes a first construction (a building) 2A in which the nuclear reactor system and the turbine system are placed, and a second construction (an administration building) 2B in which at least a part of a management system 1000 that manages the plant 1 is placed.

The nuclear reactor system and the turbine system include a plurality of existing devices 3. The existing device 3 includes an existing pump 3A and an existing power source 3B. The existing power source 3B includes an internal power source, an external power source, an emergency power source (an emergency power generator), and a battery power source. The existing device 3 includes an electric device that is operated by the supplied power. The electric device includes, for example, the existing pump 3A.

The management system 1000 manages the plant 1. The management system 1000 includes a computer system 4 and a display device 5. The computer system 4 and the display device 5 are placed in the second construction 2B.

A transportable device 6 is provided in the plant 1. The transportable device 6 is supported by a vehicle 7. The transportable device 6 is carried by the vehicle 7. In the present embodiment, the transportable device 6 includes a transportable pump 6A and a transportable power source 6B. The vehicle 7 includes a vehicle 7A that carries the transportable pump 6A and a vehicle 7B that carries the transportable power source 6B.

In the following descriptions, the transportable device 6 and the vehicle 7 together are appropriately referred to as "device vehicle 8", the transportable pump 6A and the vehicle 7A together are appropriately referred to as "pump vehicle 8A", and the transportable power source 6B and the vehicle 7B together are appropriately referred to as "power source vehicle 8B". The device vehicle 8 includes the pump vehicle 8A and the power source vehicle 8B.

When the existing device 3 has an abnormality, the existing device 3 is substituted by the transportable device 6. When the existing device 3 is normal, the transportable device 6 (the device vehicle 8) is placed (stored) at a standby position PJ1 in the plant 1. When the existing device 3 has an abnormality, the transportable device 6 is moved from the standby position PJ1 to a predetermined position PJ2 for substitution to be operated instead of the existing device 3.

In the plant 1, a plurality of workers work. Each worker has a mobile terminal 9. The mobile terminal 9 includes a portable computer such as a smartphone or a tablet-type personal computer.

Figure 2:
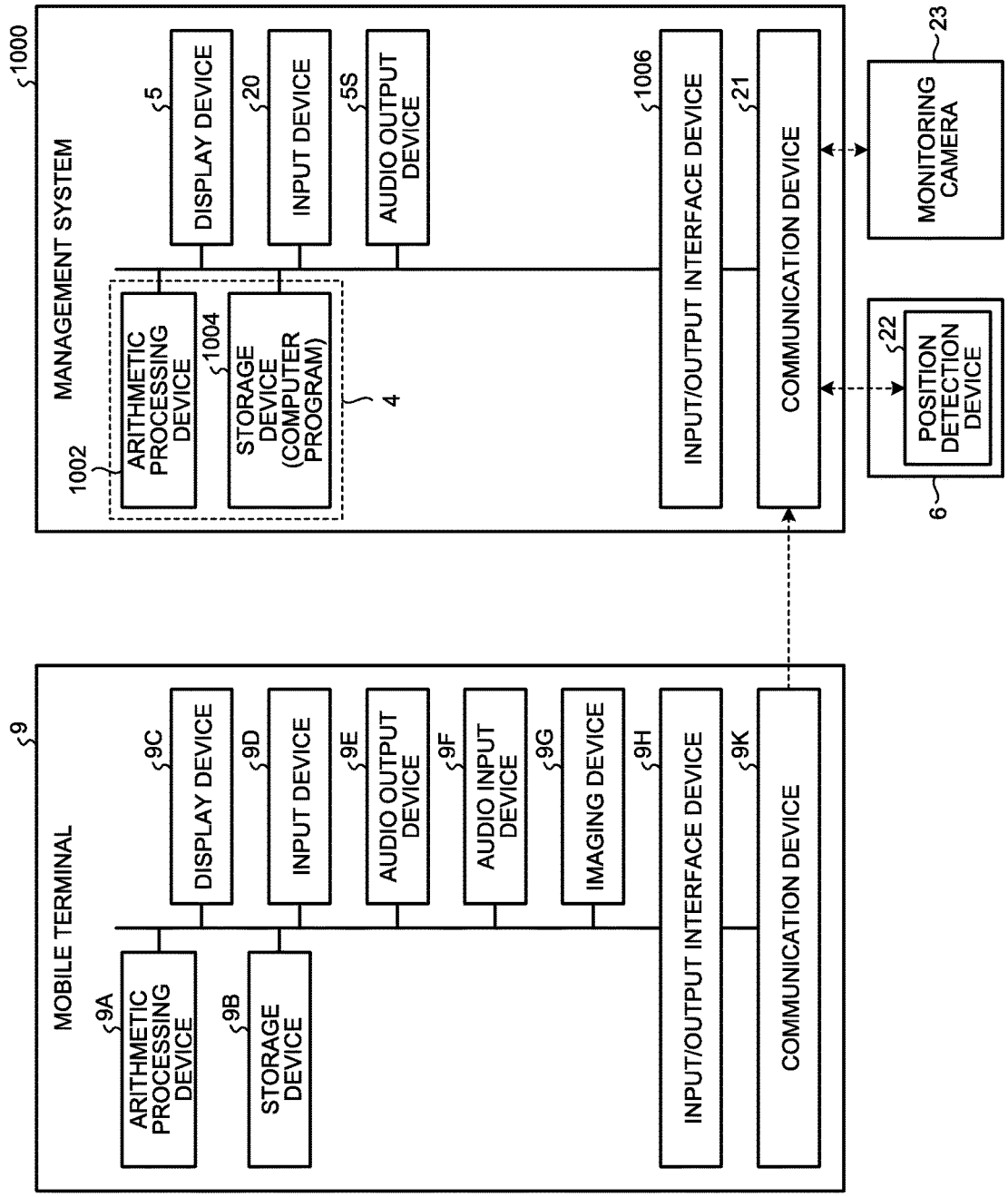
FIG. 2 is a block diagram illustrating an example of a hardware configuration of a mobile terminal and a management system according to the first embodiment.

FIG. 2 is a block diagram illustrating a hardware configuration of the mobile terminal 9 and the management system 1000 according to the present embodiment.

The mobile terminal 9 includes an arithmetic processing device 9A, a storage device 9B, a display device 9C, an input device 9D, an audio output device 9E, an audio input device 9F, an imaging device 9G, an input/output interface device 9H, and a communication device 9K.

The arithmetic processing device 9A includes a microprocessor such as a CPU (Central Processing Unit). The storage device 9B includes a memory such as a ROM (Read Only Memory) or a RAM (Random Access Memory) and a storage.

The display device 9C includes a flat panel display such as a liquid crystal display (LCD) or an organic electroluminescence display (OLED). The input device 9D is operated to generate input data. In the present embodiment, the input device 9D includes a touch sensor provided on a display screen of the display device 9C. The display device 9C includes a touch panel.

The audio output device 9E includes a speaker. The audio input device 9F includes a microphone.

The imaging device 9G includes a video camera function capable of acquiring moving image data of an object, and a still camera function capable of acquiring still image data of the object. The imaging device 9G includes an optical system and an image pickup device that acquires imaging data of the object via the optical system. The image pickup device includes a CCD (Charge Coupled Device) image sensor, or a CMOS (Complementary Metal Oxide Semiconductor) image sensor.

The input/output interface device 9H performs data communication among the arithmetic processing device 9A, the storage device 9B, the display device 9C, the input device 9D, the audio output device 9E, the audio input device 9F, the imaging device 9G, and the communication device 9K.

The communication device 9K performs data communication wirelessly with the management system 1000. The communication device 9K performs data communication with the management system 1000 by using at least one of a mobile phone communication network, the Internet connection, and a local area network.

The management system 1000 includes the computer system 4. The management system 1000 includes an arithmetic processing device 1002, a storage device 1004, the display device 5, an input device 20, an audio output device 5S, an input/output interface device 1006, and a communication device 21.

The arithmetic processing device 1002 includes a microprocessor such as a CPU. The storage device 1004 includes a memory such as a ROM or a RAM and a storage. The arithmetic processing device 1002 performs arithmetic processing according to a computer program stored in the storage device 1004.

The display device 5 includes a flat panel display. The input device 20 is operated to generate input data. The input device 20 includes at least one of a keyboard and a mouse. The input device 20 can include the touch sensor provided on the display screen of the display device 5. The audio output device 5S includes a speaker.

The input/output interface device 1006 performs data communication among the arithmetic processing device 1002, the storage device 1004, the display device 5, the input device 20, the audio output device 5S, and the communication device 21.

The communication device 21 performs data communication wirelessly with the mobile terminal 9. The communication device 21 performs data communication with the mobile terminal 9 by using at least one of the mobile phone communication network, the Internet connection, and the local area network.

The mobile terminal 9 and the management system 1000 can perform data communication in a wired manner. The management system 1000 can perform data communication with a position detection device 22 provided in the transportable device 6 and a monitoring camera 23 installed in the plant 1.

Figure 3:
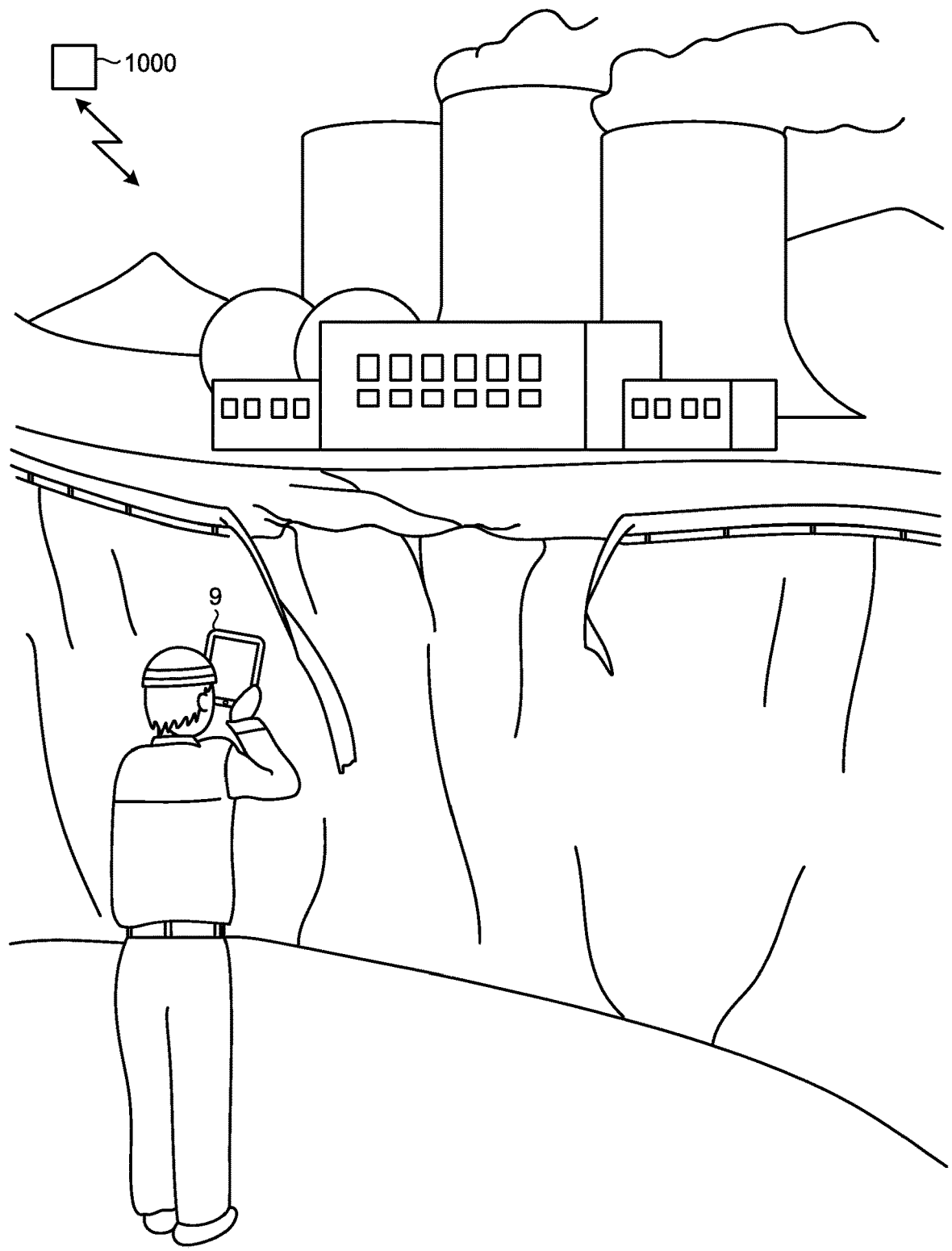
FIG. 3 is a diagram illustrating an example of the mobile terminal according to the first embodiment.

FIG. 3 is a diagram illustrating an example of the mobile terminal 9 according to the present embodiment. As illustrated in FIG. 3, a worker can acquire images or videos (moving images) at various positions (places) in the plant 1 by using a camera of the mobile terminal 9. Further, the worker can acquire sound in various places of the plant 1 by using the audio input device 9F of the mobile terminal 9. The worker can acquire images of a track (a road) provided in the property of the plant 1 by using the imaging device 9G. The worker can acquire images inside of the construction 2 by using the imaging device 9G. The image of the plant 1 acquired by the imaging device 9G of the mobile terminal 9 is wirelessly transmitted to the management system 1000.

Figure 4:
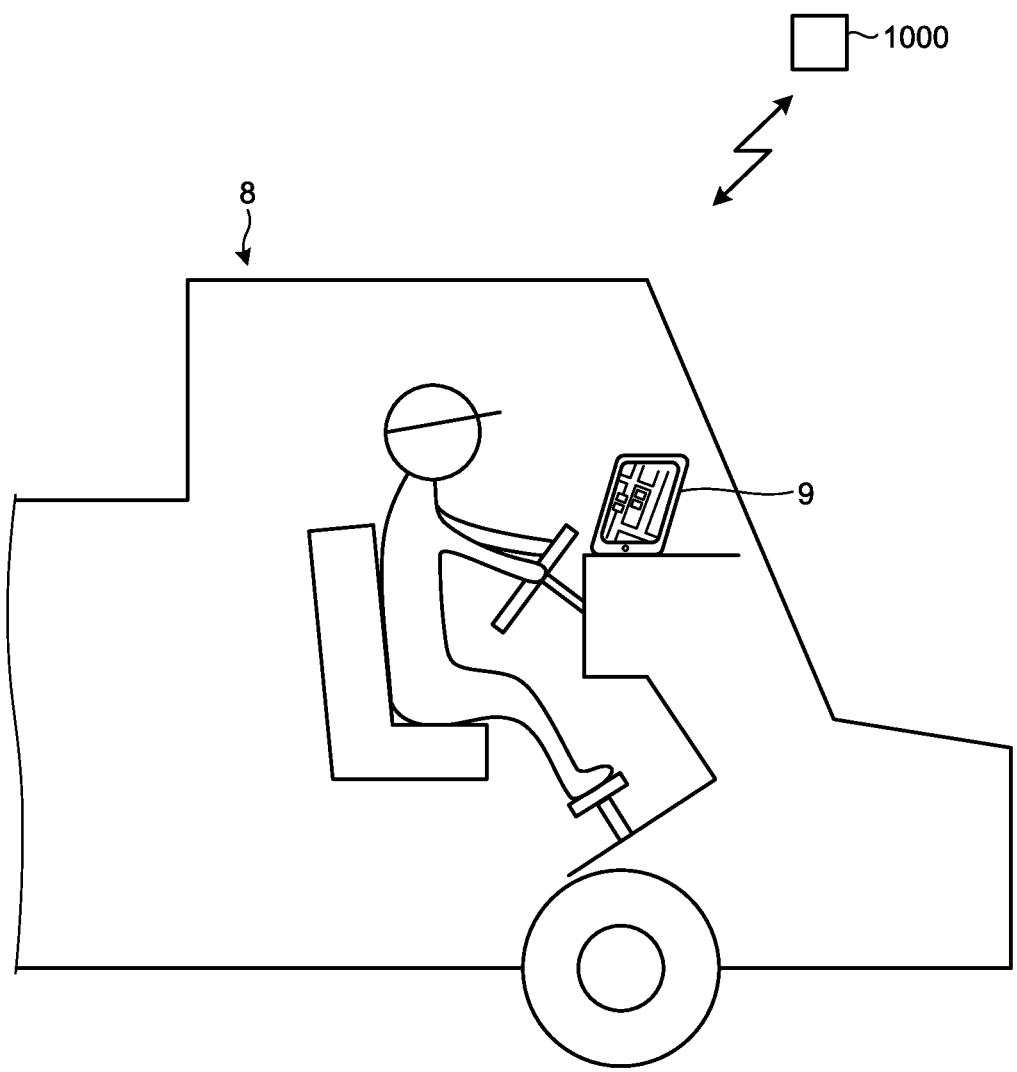
FIG. 4 is a diagram illustrating an example of the mobile terminal according to the first embodiment.

FIG. 4 is a diagram illustrating an example of the mobile terminal 9 according to the present embodiment. As illustrated in FIG. 4, the device vehicle 8 (the vehicle 7) is operated (driven) by a worker. The worker can drive the device vehicle 8 while watching the display device 9C of the mobile terminal 9. The data transmitted from the management system 1000 to the mobile terminal 9 is displayed on the display device 9C of the mobile terminal 9. The worker can drive the device vehicle 8 while watching the data displayed on the display device 9C of the mobile terminal 9. Further, the worker can drive the device vehicle 8 by using a navigation function of the mobile terminal 9. The navigation function of the mobile terminal 9 includes navigation by voice, and navigation by an image.

Figure 5:
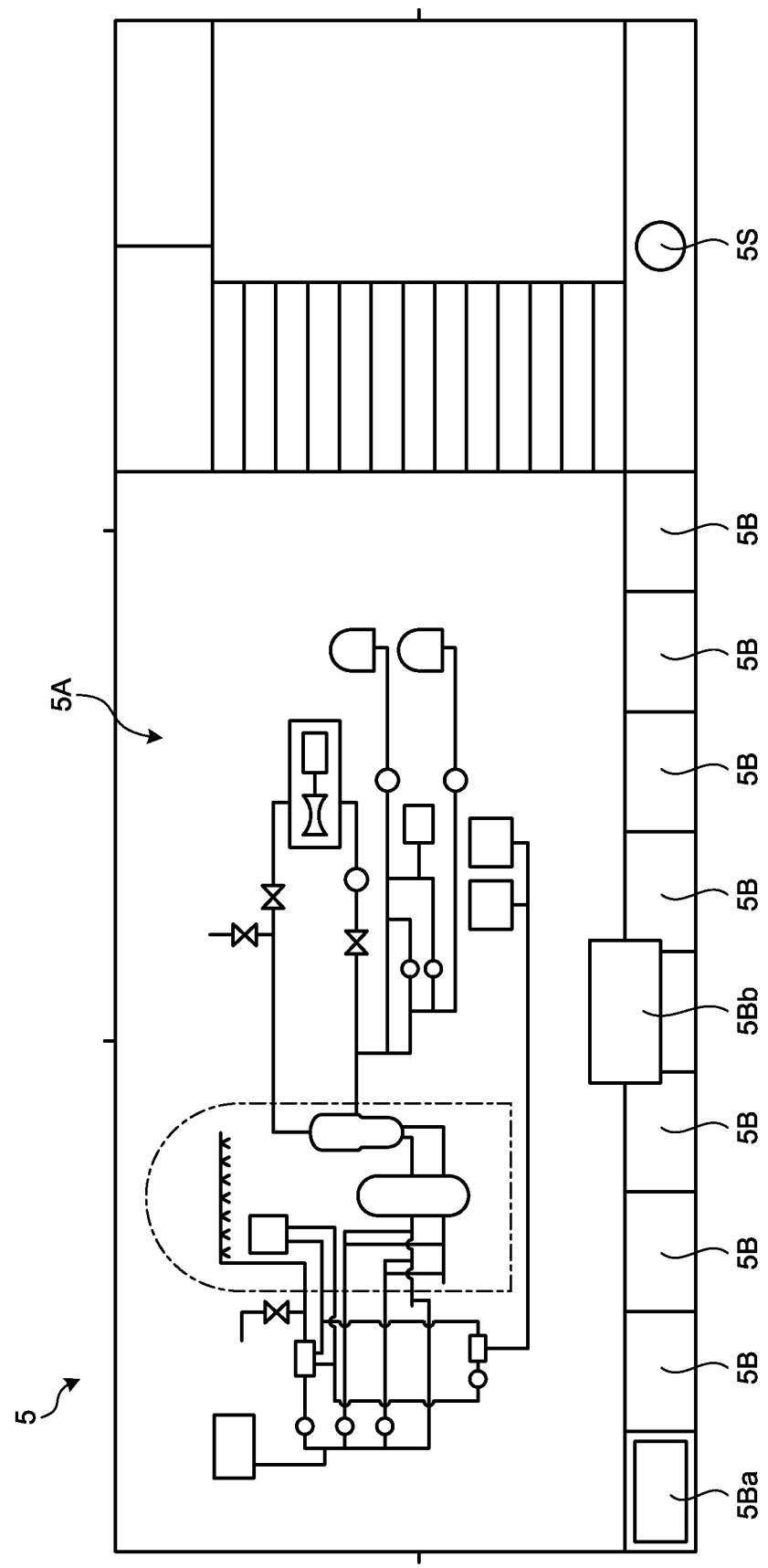
FIG. 5 is a diagram illustrating an example of a display device according to the first embodiment.

FIG. 5 is a diagram illustrating an example of the display device 5 of the management system 1000 according to the present embodiment. In the present embodiment, the display device 5 includes a touch panel. A worker can operate a screen displayed on the display device 5 by touching the touch sensor provided on the display screen of the display device 5. The worker can input an input signal (an operation signal) by touching the touch sensor of the display device 5.

In the present embodiment, the display device 5 includes a plurality of combined touch panels. In the present embodiment, wide touch panels are placed two vertically, and three horizontally. That is, in the present embodiment, the display device 5 includes six combined touch panels. The display device 5 includes a six-surface display and a large set of touch sensors over the six surfaces.

The display device 5 can display a main screen 5A and a sub-screen 5B. A plurality of main screens 5A can be displayed on a main screen area in which the main screen 5A is displayed. The sub-screen 5B is placed below the main screen 5A. The main screen 5A can display the display data input to the display device 5 by using at least one of an image, a numerical value, and characters. In an example illustrated in FIG. 5, display data indicating a coolant system and a power source system of the plant 1 is displayed on the main screen 5A. A plurality of sub-screens 5B are provided. Each of the sub-screens 5B can display the display data input to the display device 5 by using at least one of an image, a numerical value, and characters. When a worker touches a specific sub-screen 5B of the sub-screens 5B, the display data displayed on the main screen 5A is switched to the display data on the specific sub-screen 5B. The display data of the touched specific sub-screen 5B is displayed on the main screen 5A. Further, arbitrarily selected ones of the main screen 5A and the sub-screen 5B can be switched over.

The display device 5 can highlight a specific sub-screen 5B of the sub-screens 5B. For example, the priority (the importance degree) of the display data is set to three stages. A sub-screen 5B (5Bb) that displays first-priority display data having the highest priority is highlighted by pop-up or a display having movement. A sub-screen 5B (5Ba) that displays second-priority display data having the highest priority next to the first-priority display data is highlighted by being displayed with a colored frame. The sub-screen 5B (5Ba) can be highlighted by being displayed with a flash-displayed frame. Sub-screens 5B that display third-priority display data having the lowest priority are not highlighted.

The display device 5 has the audio output device 5S that outputs audio data. The audio output device 5S includes a speaker. The display device 5 can generate sound by using the audio output device 5S.

Figure 6:
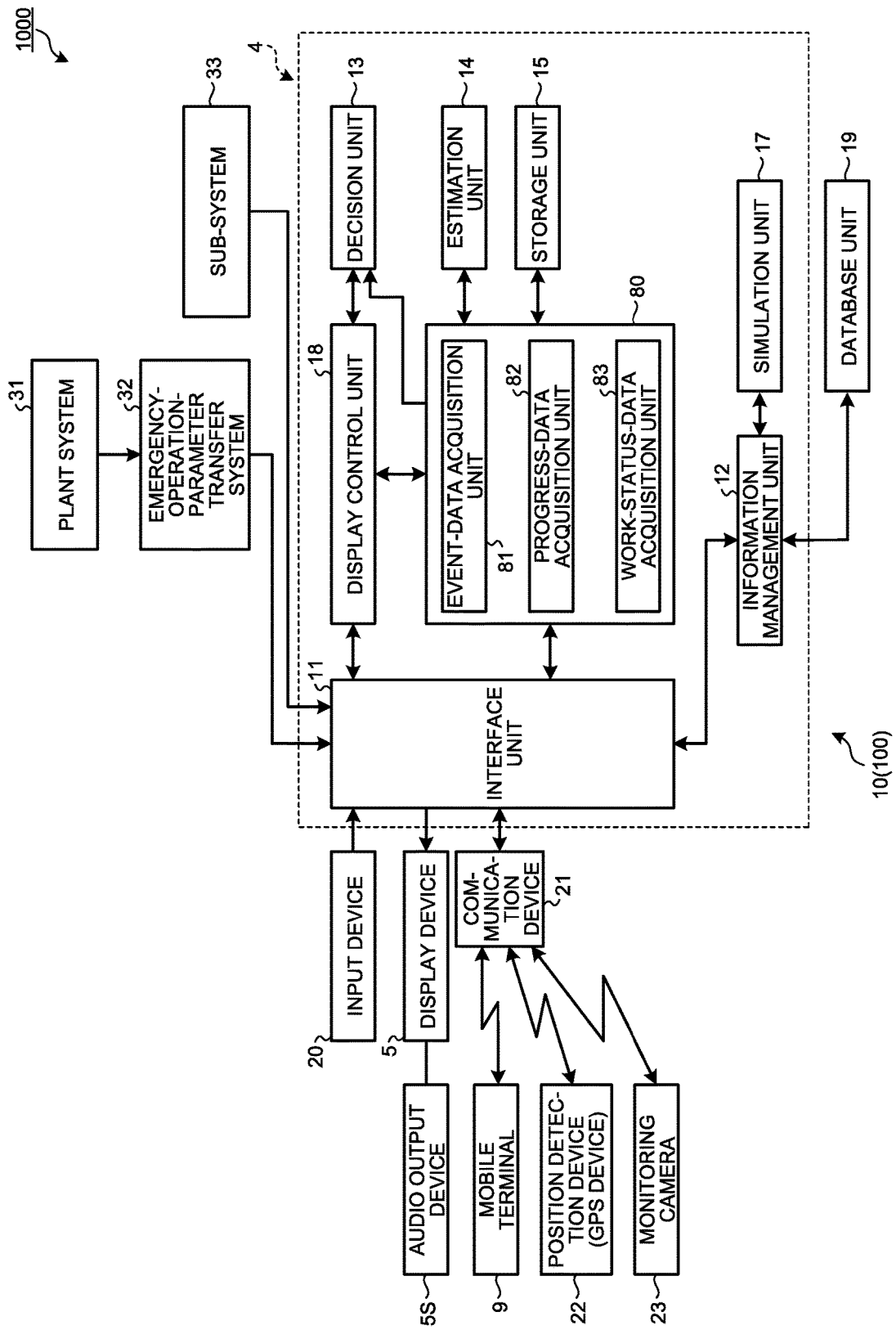
FIG. 6 is a functional block diagram illustrating an example of the management system according to the first embodiment.

Next, an example of the management system 1000 according to the present embodiment is described. FIG. 6 is a functional block diagram illustrating an example of the management system 1000 according to the present embodiment. As illustrated in FIG. 6, the management system 1000 includes the computer system 4 and the display device 5.

In the present embodiment, the management system 1000 includes a work planning system 10 that plans works in the plant 1. The management system 1000 also includes a decision-making support system 100 that supports decision making of measures against various events in case of abnormal conditions such as occurrence of a disaster. The functions of the work planning system 10 are exerted by the arithmetic processing device 1002 of the computer system 4 and a computer program stored in the storage device 1004.

When various events occur in the plant 1 due to occurrence of a disaster, the work planning system 10 plans works to be performed based on the measures decided against such events.

The contents of works that can be performed with respect to the plant 1 are finite. A plurality of kinds of contents exist as the contents of works that can be performed with respect to the plant 1. In the present embodiment, work data indicating the contents of works that can be performed with respect to the plant 1 is determined in advance. Further, work data not determined in advance can be added thereto.

In the present embodiment, event data indicating an event of the plant 1 is acquired. Each importance degree of a plurality of pieces of work data is decided based on the acquired event data. In the present embodiment, the display device 5 displays the plurality of pieces of work data while they are associated with respective importance degrees.

Further, in the present embodiment, progress data indicating each progress status of a plurality of works is acquired. The display device 5 displays work data and the importance degree of the work data while the work data and the importance degree thereof are associated with the progress statuses of the works.

A worker (a manager) can recognize the importance degree of work data and a progress status via the display device 5. Accordingly, it is possible to appropriately plan works.

The computer system 4 in the management system 1000 includes an interface unit 11, a data acquisition unit 80, an information management unit 12, a decision unit 13, an estimation unit 14, a storage unit 15, a simulation unit 17, and a display control unit 18.

The functions of the interface unit 11 are exerted by the input/output interface device 1006. The functions of the storage unit 15 are exerted by the storage device 1004. The functions of the data acquisition unit 80, the information management unit 12, the decision unit 13, the estimation unit 14, the simulation unit 17, and the display control unit 18 are exerted by the arithmetic processing device 1002.

The management system 1000 includes a database unit 19 connected to the computer system 4, the input device 20 connected to the computer system 4, the display device 5 connected to the computer system 4, and the communication device 21 capable of communicating with the mobile terminal 9, the position detection device 22, and the monitoring camera 23. The communication device 21 can be a wireless communication device or a wired communication device.

The input device 20 includes at least one of a keyboard, a mouse, a microphone, and a camera, to generate an input signal (an operation signal) by being operated by a worker. The input device 20 can be provided in plural. When the display device 5 includes a touch panel, the input device 20 includes a display unit of the display device 5. The input signal generated by operating the input device 20 is supplied to the interface unit 11.

The position detection device 22 detects the position of the transportable device 6 (the device vehicle 8) to output position data indicating the position of the transportable device 6. In the present embodiment, the position detection device 22 includes a GPS (Global Positioning System). A GPS receiver is mounted on the device vehicle 8. The position detection device 22 includes the GPS receiver mounted on the device vehicle 8. The position of the transportable device 6 (the device vehicle 8) in a global coordinate system is detected by the position detection device 22. Position data indicating the position of the transportable device 6 detected by the position detection device 22 is supplied to the interface unit 11 via the communication device 21. The position data detected by the position detection device 22 can be temporarily stored and supplied to the interface unit 11 connected in a wired manner.

The monitoring camera 23 is installed at a plurality of positions in the plant 1. The image data acquired by the monitoring camera 23 is supplied to the interface unit 11 via the communication device 21.

The mobile terminal 9 and the computer system 4 can be connected to each other in a wired or wireless manner. Data communication can be performed in a state in which the mobile terminal 9 and the computer system 4 are connected to each other in a wired manner. The position detection device 22 and the computer system 4 can be connected in a wired or wireless manner. Data communication can be performed in a state in which the position detection device 22 and the computer system 4 are connected to each other in a wired manner. The monitoring camera 23 and the computer system 4 can be connected to each other in a wired manner.

The interface unit 11 acquires data supplied from an external device of the computer system 4. Further, the interface unit 11 supplies data to the external device from the computer system 4.

The data acquisition unit 80 includes an event-data acquisition unit 81 that acquires event data of the plant 1, a progress-data acquisition unit 82 that acquires progress data of a work, and a work-status-data acquisition unit 83 that acquires work status data.

The event-data acquisition unit 81 acquires event data indicating an event of the plant 1. The event data includes any one of both of damage data indicating a damage status of the plant 1 and recovery data indicating a recovery status of damage of the plant 1.

For example, a worker holding the mobile terminal 9 moves to the first construction 2A of the plant 1. Event data indicating the damage status of the nuclear reactor system or the turbine system of the plant 1 or indicating the recovery status of the damage is acquired by the mobile terminal 9. The event data acquired by the mobile terminal 9 is supplied from the mobile terminal 9 to the event-data acquisition unit 81 via the communication device 21 and the interface unit 11.

The event data indicating a damage status of the nuclear reactor system or the turbine system of the plant 1 or indicating a recovery status of the damage is acquired by the monitoring camera 23. The event data acquired by the monitoring camera 23 is supplied from the mobile terminal 9 to the event-data acquisition unit 81 via the communication device 21 and the interface unit 11.

The event data indicating an event of the plant 1 is acquired by various kinds of sensors provided in the plant 1. The event data acquired by the sensors is supplied from the mobile terminal 9 to the event-data acquisition unit 81.

The progress-data acquisition unit 82 acquires progress data indicating each progress status of a plurality of works. For example, a worker holding the mobile terminal 9 inputs the progress data indicating a progress status of a work to the mobile terminal 9. The mobile terminal 9 acquires the progress data. The progress data acquired by the mobile terminal 9 is supplied from the mobile terminal 9 to the progress-data acquisition unit 82 via the communication device 21 and the interface unit 11.

The progress data indicating a progress status of a work may be acquired by various kinds of sensors provided in the plant 1. The progress data acquired by the sensors is supplied from the sensors to the progress-data acquisition unit 82.

The work-status-data acquisition unit 83 acquires work status data indicating whether each of a plurality of works is being performed normally. For example, a worker holding the mobile terminal 9 inputs the work status data indicating whether a work is being performed normally to the mobile terminal 9. The mobile terminal 9 acquires the work status data. The work status data acquired by the mobile terminal 9 is supplied from the mobile terminal 9 to the work-status-data acquisition unit 83 via the communication device 21 and the interface unit 11.

The work status data indicating whether a work is being performed normally may be acquired by various kinds of sensors provided in the plant 1. The work status data acquired by the sensors is supplied from the sensors to the work-status-data acquisition unit 83.

The storage unit 15 stores therein data necessary for work planning. The storage unit 15 stores a plurality of pieces of work data indicating the contents of works that can be performed with respect to the plant 1. The contents of works that can be performed with respect to the plant 1 are finite. A plurality of kinds of contents exist as the contents of works that can be performed with respect to the plant 1. The storage unit 15 stores a plurality of pieces of work data indicating the contents of works that can be performed with respect to the plant 1. For example, the storage unit 15 stores work data indicating a work A, work data indicating a work B, work data indicating a work C, . . . , and work data indicating a work Z.

The decision unit 13 decides each importance degree of a plurality of pieces of work data based on the event data acquired by the interface unit 11. For example, when an event A occurs, the decision unit 13 decides that, among the plurality of pieces of work data stored in the storage unit 15, the work B is most important, the work E is second most important after the work B, and the work H is third most important after the work E. When an event B occurs, the decision unit 13 decides that, among the plurality of pieces of work data stored in the storage unit 15, the work C is most important, the work A is second most important after the work C, and the work E is third most important after the work A. In other words, the decision unit 13 performs, based on the event data, ranking of the importance degrees of the plurality of pieces of work data.

The contents of events expected to occur are finite. A plurality of kinds of contents exist as the contents of events expected to occur. In the present embodiment, a relation between events expected to occur and contents of works of measures against these events is determined in advance (manualized). Further, a relation between events expected to occur and importance degrees of works of measures against these events is also determined in advance (manualized). These relations are stored in the storage unit 15.

The decision unit 13 decides, based on the event data acquired by the event-data acquisition unit 81 and storage data stored in the storage unit 15, when a certain event has occurred, each importance degree of a plurality of works performed with respect to the event, and ranks each importance degree of the plurality of works.

The estimation unit 14 estimates, based on the progress data of a work acquired by the progress-data acquisition unit 82, a scheduled end time of the work. The progress data of the work and resource data including data of the number of workers engaged in the work and data of skills of the workers are supplied to the estimation unit 14. Based on the progress data and resource data, the estimation unit 14 calculates the scheduled end time of the work.

The display control unit 18 controls the display device 5. The display control unit 18 processes the data supplied from the data acquisition unit 80 to generate display data to be displayed on the display device 5.

The interface unit 11 is connected to a plant system 31 via an emergency-operation-parameter transfer system 32. The interface unit 11 is also connected to a sub-system 33.

The plant system 31 manages plant data of the plant 1. The plant data includes operation data of the nuclear reactor system, and is detected by a sensor placed in the nuclear reactor system. The plant data includes, for example, temperature data of the nuclear reactor system and flow rate data of the primary cooling water in the nuclear reactor system. The data acquisition unit 80 can acquire the plant data from the plant system 31.

In the present embodiment, the event data includes the plant data.

The emergency-operation-parameter transfer system 32 outputs an operation parameter of the plant 1 in case of emergency (in case of abnormal conditions). The data acquisition unit 80 can acquire the operation parameter in case of emergency from the emergency-operation-parameter transfer system 32.

The sub-system 33 manages peripheral data of the plant 1, which is different from the plant data. The peripheral data includes weather data, for example. The data acquisition unit 80 can acquire the peripheral data from the sub-system 33.

The information management unit 12 manages the plant data supplied from the plant system 31. The information management unit 12 also manages data supplied from the sub-system 33, the input device 20, and the communication device 21. The information management unit 12 also manages data stored in the database unit 19. The display control unit 18 generates display data to be displayed on the display device 5 from data managed by the information management unit 12.

The simulation unit 17 estimates a chronological change of the plant 1 based on the plant data to generate scenario data (plant estimation data) indicating an estimated event of the plant 1.

In the present embodiment, the event data includes the scenario data indicating an estimated event of the plant 1.

The database unit 19 stores therein the event data acquired by the data acquisition unit 80. The database unit 19 also stores therein the plant data supplied from the plant system 31, the scenario data generated by the simulation unit 17, and the display data generated by the display control unit 18. The information management unit 12 can extract data stored in the database unit 19. The database unit 19 also stores therein data from the sub-system 33, the input device 20, and the communication device 21.

Figure 7:
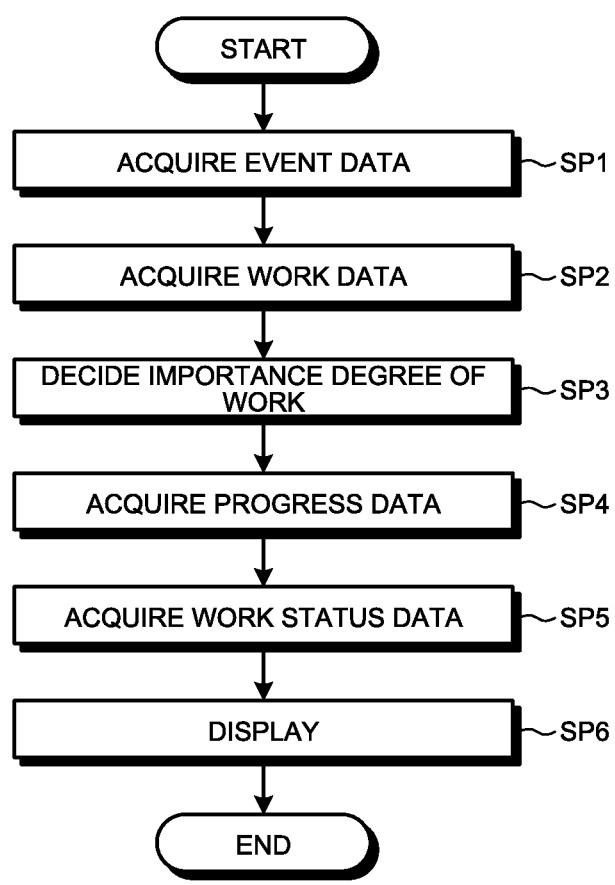
FIG. 7 is a flowchart illustrating an example of a work planning method according to the first embodiment.

An example of a work planning method according to the present embodiment is described next with reference to a flowchart in FIG. 7.

When a disaster such as a severe accident occurs in the plant 1, various events occur in the plant 1. For example, events such as an event where the temperature of a nuclear reactor increases, an event where the existing pump 3A stops, and an event where the existing power source 3B stops occur. The event-data acquisition unit 81 acquires event data indicating an event of the plant 1 (Step SP1).

The decision unit 13 acquires, based on the event data acquired by the event-data acquisition unit 81, work data indicating the contents of works supposed to be performed for measures against the event from the storage unit 15 (Step SP2).

The decision unit 13 then decides, based on the event data, each importance degree of a plurality of pieces of work data extracted from the storage unit 15 (Step SP3).

Works with respect to an occurred event are performed by workers. The contents of works to be performed are determined in advance (manualized) while corresponding to the occurred event. The workers perform works corresponding to the occurred event.

Progress data of a work is supplied to the progress-data acquisition unit 82. As described above, it is possible that, as a worker holding the mobile terminal 9 inputs the progress data indicating a progress status of the work to the mobile terminal 9, the progress data may be supplied to the progress-data acquisition unit 82. The progress data acquired by various kinds of sensors provided in the plant 1 may be supplied to the interface unit 11. The progress-data acquisition unit 82 acquires progress data indicating each progress status of a plurality of works (Step SP4).

Further, work status data indicating whether each of the plurality of works is being performed normally is supplied to the work-status-data acquisition unit 83. As described above, as a worker holding the mobile terminal 9 inputs work status data indicating whether a work is being performed normally to the mobile terminal 9, the work status data may be supplied to the work-status-data acquisition unit 83. The work status data acquired by various sensors provided in the plant 1 may be supplied to the work-status-data acquisition unit 83. The work-status-data acquisition unit 83 acquires the work status data indicating whether each of the plurality of works is being performed normally (Step SP5).

The display control unit 18 displays a plurality of pieces of work data on the display device 5 while they are associated with respective importance degrees or displays work data and the importance degree on the display device 5 while the work data and the importance degree are associated with the progress statuses of the works (Step SP6).

The display control unit 18 may cause the display device 5 to display time data indicating a scheduled end time of a work estimated by the estimation unit 14.

The display control unit 18 may cause the display device 5 to display work status data acquired by the work-status-data acquisition unit 83 and indicating whether each of a plurality of works is being performed normally, while the work status data is associated with work data, an importance degree, and a progress status.

Figure 8:
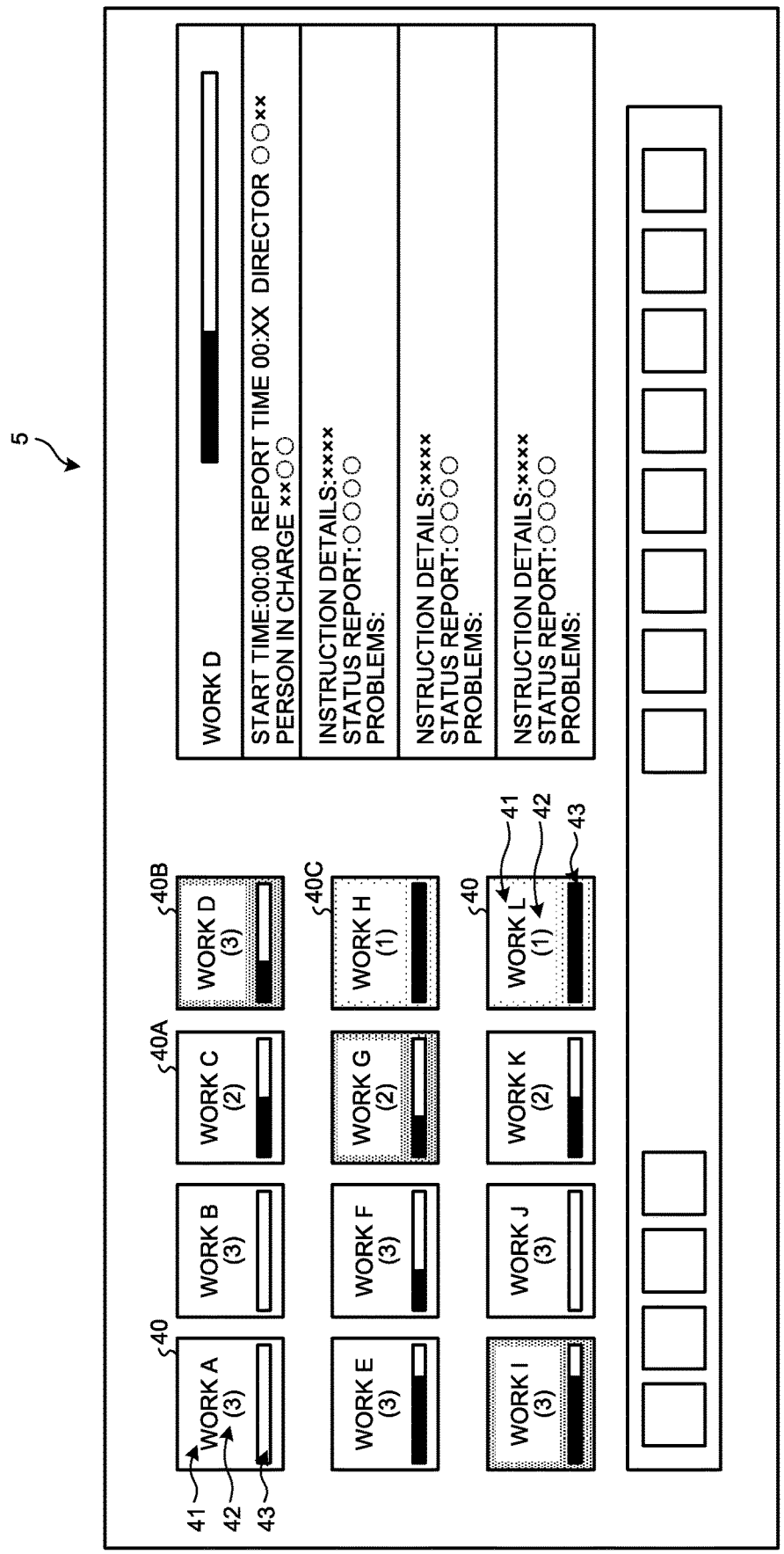
FIG. 8 is a diagram illustrating an example of the display device according to the first embodiment.

FIG. 8 is an example illustrating an example of the display device 5 according to the present embodiment. As illustrated in FIG. 8, the display control unit 18 displays a plurality of icons (tiles) 40 in a left area of a main screen 5A. The icon 40 includes work data 41 indicating the contents of works, importance degree data 42 indicating the importance degree of works, and progress data 43 of works.

In the example illustrated FIG. 8, the display device 5 displays 12 icons 40 including work data 41 that indicates the contents of 12 works (the work A, the work B, the work C, the work D, the work E, the work F, the work G, the work H, the work I, the work J, the work K, and the work L), respectively.

In the example illustrated in FIG. 8, three stages of importance degree of works (an importance degree (1), an importance degree (2), and an importance degree (3)) are set. As illustrated in FIG. 8, the display control unit 18 causes the display device 5 to display a plurality of pieces of work data 41 while associating these pieces of work data 41 with importance degree data 42.

In the example illustrated in FIG. 8, the progress data 43 is displayed with a bar. As illustrated in FIG. 8, the display control unit 18 causes the display device 5 to display the work data 41 and the importance data 42 while they are associated with the progress data 43 of a work.

The display control unit 18 causes the display device 5 to display work data 41 of a work being performed normally and work data 41 of a work not being performed normally with a mutually different design. In the example illustrated in FIG. 8, the display device 5 displays the work data 41 of a work being performed normally and the work data 41 of a work not being performed normally while distinguishing them from each other by mutually differentiating the colors of the respective icons 40. For example, an icon 40A (such as the work C) indicates the work data 41 of a work being performed normally. An icon 40C (such as the work H) indicates the work data 41 of a work not being performed normally (a trouble is occurring).

The display control unit 18 causes the display device 5 to display detailed data of one work among a plurality of works in a right area of the main screen 5A. In the example illustrated in FIG. 8, detailed data of the work D is displayed. Data related to a start time of the work D, a reported time when a worker reported, instruction details, a director, and a reporter (a person in charge) is displayed. The display control unit 18 may cause the display device 5 to display time data indicating a scheduled end time of the work D.

Figure 9:
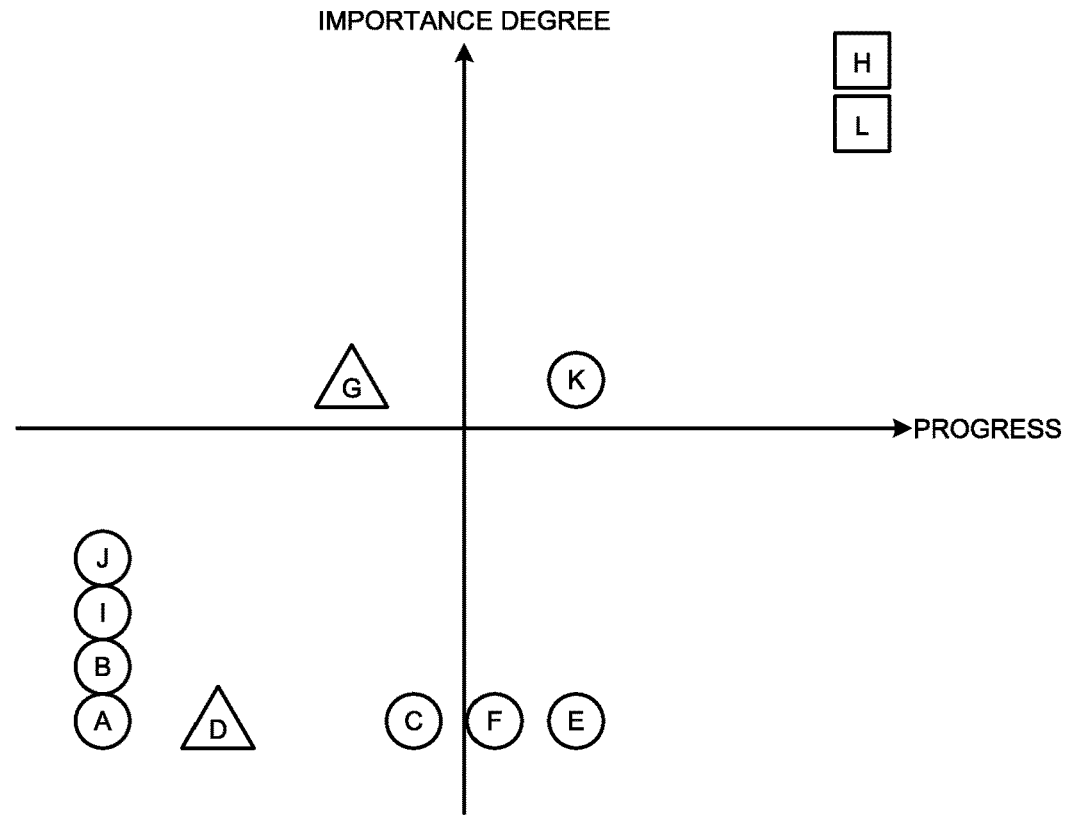
FIG. 9 is a diagram illustrating an example of the display device according to the first embodiment.

FIG. 9 is a diagram illustrating another example of the screen on the display device 5. As illustrated in FIG. 9, the display control unit 18 may cause the display device 5 to display work data, importance degree data, and progress data while showing these pieces of data graphically. Due to this configuration, work data, importance degree data, and progress data are displayed while they are associated with one another. Further, in the example illustrated in FIG. 9, work status data is also associated with these pieces of data and displayed on the display device 5.

In FIG. 9, the horizontal axis of the graph represents progress data and the vertical axis of the graph represents importance degree data. The horizontal axis of the graph may represent importance degree data and the vertical axis of the graph may represent progress data.

In FIG. 9, the alphabets (A, B, C, D, E, F, G, H, I, J, K, L) represent work data. The figures (circle, triangle, and square) encircling these alphabets represent work status data.

Figure 10:
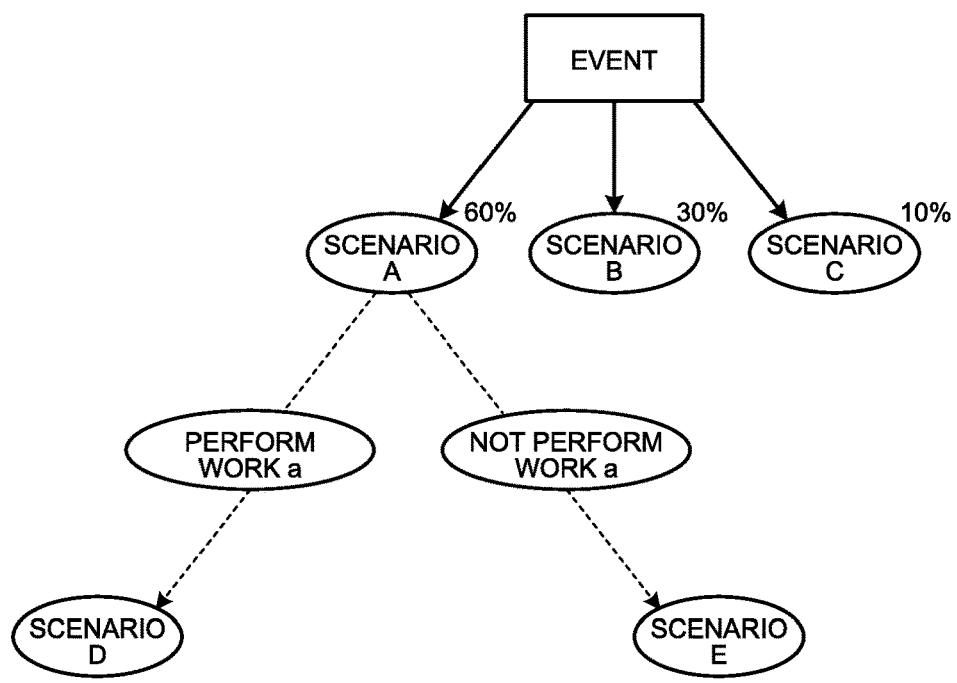
FIG. 10 is a diagram illustrating an example of the display device according to the first embodiment.

FIG. 10 is a diagram illustrating an example of a screen of the display device 5 on which scenario data is displayed. As described above, based on plant data (event data), the simulation unit 17 estimates a chronological change of the plant 1 to generate scenario data (plant estimation data) indicating an estimated event of the plant 1.

When a certain event has occurred, event data indicating the event is acquired by the event-data acquisition unit 81. Based on the event data acquired by the event-data acquisition unit 81, the simulation unit 17 generates a plurality of pieces of estimated scenario data (a scenario A, a scenario B, and a scenario C), as well as probability data indicating probabilities of occurrence of these scenarios. In the example illustrated in FIG. 10, as scenario data, the simulation unit 17 generates three pieces of scenario data (the scenario A, the scenario B, and the scenario C), and generates the probabilities (60%, 30%, 10%) of occurrence of respective scenarios. The display control unit 18 causes the display device 5 to display these pieces of scenario data and probability data.

The decision unit 13 may decide each importance degree of a plurality of pieces of work data based on scenario data. That is, the decision unit 13 may decide each importance degree of a plurality of pieces of work data while assuming that the scenario data is event data. The data acquisition unit 80 acquires scenario data from the simulation unit 17. The decision unit 13 decides each importance degree of a plurality of pieces of work data based on the scenario data acquired by the data acquisition unit 80. The display control unit 18 may cause the display device 5 to display a plurality of pieces of work data while associating them with importance degree data indicating an importance degree.

The simulation unit 17 may further generate scenario data based on work data of a work that is expected to be performed. In the example illustrated in FIG. 10, it is expected that a work α is performed. The simulation unit 17 may generate scenario data when the work α has been performed (a scenario D) and scenario data when the work α is not performed (a scenario E).

As described above, according to the present embodiment, each importance degree of a plurality of pieces of work data is decided based on event data indicating an event of the plant 1, and the plurality of pieces of work data are displayed while they are associated with importance degree data indicating the importance of each work. Therefore, based on the displayed result, it is possible to appropriately plan the works of measures against the event of the plant 1. A worker (a manager) can appropriately plan works by recognizing the displayed part on the display device 5 in which work data and importance degree data are associated with each other.

In the present embodiment, event data includes scenario data indicating an estimated event of the plant 1. Accordingly, it is possible to smoothly recognize the importance degrees of works that are estimated to be performed in the future and to appropriately plan the works.

In the present embodiment, progress data indicating each progress status of a plurality of works is acquired, and the display device 5 displays work data and importance degree data while associating them with the progress data. Accordingly, not only the importance degrees of works, but also progress statuses thereof are smoothly recognized, so that it is possible to appropriately plan the works.

In the present embodiment, a scheduled end time of a work is estimated based on progress data, and the display device 5 displays time data indicating the scheduled end time. Accordingly, the scheduled end time of a certain work is recognized, and thus it is possible to appropriately plan the next work.

In the present embodiment, work status data indicating whether each of a plurality of works is being performed normally is acquired, and the display control unit 18 causes the display device 5 to display work data of a work being performed normally and work data of a work not being performed normally with a mutually different design. Accordingly, the progress status of each work is recognized, and thus it is possible to appropriately plan these works.

Second Embodiment

A second embodiment is described. In the following descriptions, constituent elements like or equivalent to those in the above embodiment are denoted by like reference signs and descriptions thereof will be simplified or omitted.

Figure 11:
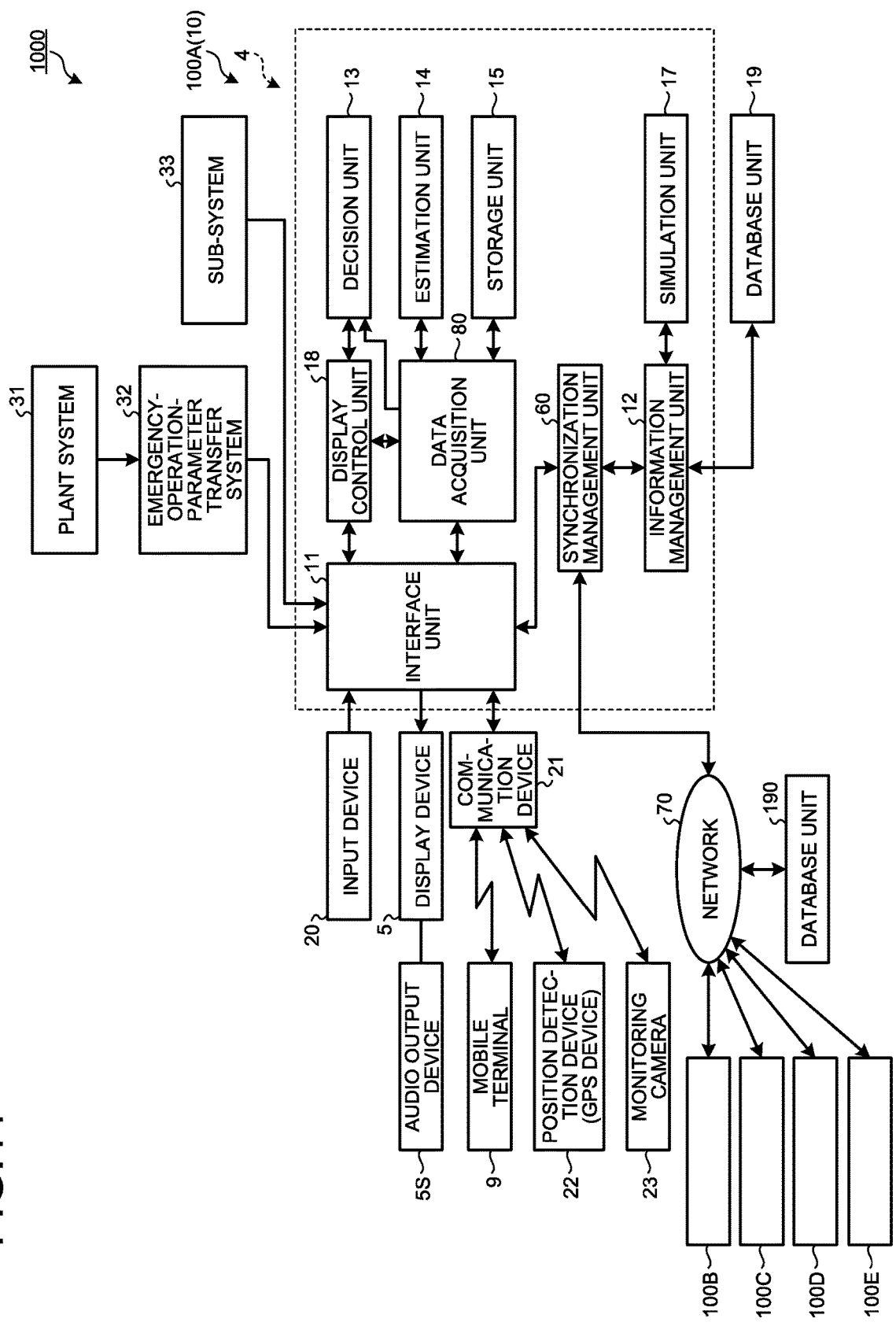
FIG. 11 is a diagram illustrating an example of a decision-making support system according to a second embodiment.

FIG. 11 is a diagram illustrating an example of the decision-making support system 100 according to the present embodiment. The decision-making support system 100 supports decision making of measures in case of emergency (in case of abnormal conditions).

As illustrated in FIG. 11, a decision-making support system 100A, a decision-making support system 100B, a decision-making support system 100C, a decision-making support system 100D, and a decision-making support system 100E are connected so as to be able to perform data communication with each other via a network 70. A nuclear-reactor comprehensive disaster network is constructed by the plurality of decision-making support systems (100A, 100B, 100C, 100D, and 100E) connected with each other via the network 70. The network (the nuclear-reactor comprehensive disaster network) 70 is used at the time of comprehensive disasters involved with the nuclear reactor. Each of the decision-making support systems (100A, 100B, 100C, 100D, and 100E) has the same configuration as the decision-making support system 100 described in the above embodiment. FIG. 11 illustrates an example in which five decision-making support systems (100A, 100B, 100C, 100D, and 100E) are provided. The number of decision-making support systems connected with each other via the network 70 is arbitrary.

The decision-making support system 100A is placed, for example, in the nuclear power generation plant. The decision-making support system 100B is placed, for example, in an electric power company. The decision-making support system 100C is placed, for example, in relevant departments of a local government. The decision-making support system 100D is placed, for example, in relevant departments of the government. The government includes at least one of a government policy organization, a regulatory agency, and an off-site center. The decision-making support system 100E is placed, for example, in a plant manufacturer.

In the following descriptions, if it is not required to distinguish the respective decision-making support systems (100A, 100B, 100C, 100D, and 100E), these are simply referred to as "decision-making support system 100".

In the present embodiment, each of the decision-making support systems 100 includes a synchronization management unit 60. The synchronization management unit 60 is connected to the interface unit 11 and the information management unit 12 respectively. The synchronization management unit 60 is connected to the network 70. The synchronization management unit 60 of a certain decision-making support system 100 of the decision-making support systems 100 shares data with the synchronization management units 60 of other decision-making support systems 100. The synchronization management unit 60 performs transmission and reception of data, and update of data through the network 70.

When being disconnected from the network 70 and then reconnected to the network 70 again after passage of a predetermined time, the synchronization management unit 60 of the certain decision-making support system 100 updates data based on the data received from the synchronization management units 60 of other decision-making support systems 100. The decision-making support systems 100 can share data via the network 70.

In the present embodiment, a database unit 190 connected to the network 70 is provided. The respective decision-making support systems 100 share data with the database unit 190 via the network 70.

The information management unit 12 causes the display control unit 18 to generate display data based on abnormal condition data required in case of emergency. The abnormal condition data includes data required for decision making. The information management unit 12 shares abnormal condition data via the network 70. That is, the information management unit 12 of a certain decision-making support system 100 of the decision-making support systems 100 shares the abnormal condition data with information management units 12 of other decision-making support systems 100. The information management unit 12 performs transmission and reception of the abnormal condition data, and update of the abnormal condition data via the network 70.

The abnormal condition data includes data described below.

(1) Personnel-resource management information—input from the input device 20

(2) Logistic support (relief goods transport) information—input from the input device 20

(3) Radiation monitoring (periphery, in a plant, and in a building) information—input from the monitoring post via the network 70

(4) Weather information, wind direction information, earthquake information, and tsunami information—input via the network 70

(5) Damage status (camera image, landslide, restoration status) information in a plant—input from the input device 20, the mobile terminal 9, and the monitoring camera 23 via the interface unit 11

(6) Plant reactor-core information (fuel temperature, temperature in a reactor, pressure in a reactor, and the like)—input from the emergency-operation-parameter transfer system 32

(7) Progress estimation information of a plant status—input from the simulation unit 17

(8) Electric power transmission information around the plant—input from an electric power company via the network 70

(9) Response status (status of a portable facility) information in the plant—input from the input device 20

(10) Information of documents obligated to be stored such as design drawings of a nuclear reactor—input from the database unit 190 via the network 70

(11) Task management information—input from the input device 20

(12) Fax image information and the like—input from the input device 20

In the present embodiment, the information management unit 12 selects the abnormal condition data required for decision making, among a plurality of pieces of abnormal condition data, and causes the display control unit 18 to generate display data by using the selected abnormal condition data. The information management unit 12 of a certain decision-making support system 100 shares the display data with other decision-making support systems 100 via the network 70.

Each of the decision-making support systems (100A, 100B, 100C, 100D, and 100E) is placed in different parties concerned. The parties concerned include a nuclear power generation plant, an electric power company, a local government, the government, and a plant manufacturer. The abnormal condition data required for decision making of each of the decision-making support systems (100A, 100B, 100C, 100D, and 100E) is different from each other in various states.

In the present embodiment, the information management units 12 of the respective decision-making support systems (100A, 100B, 100C, 100D, and 100E) select the abnormal condition data having a high priority, among the plurality of pieces of abnormal condition data, based on the priority of the abnormal condition data set in advance and cause the display control unit 18 to generate display data by using the selected abnormal condition data.

The abnormal condition data to be selected includes the latest data. The latest data includes real time data. The abnormal condition data is input to the information management unit 12 on a real-time basis. The database unit 190 stores therein the abnormal condition data in association with the time at which emergency data is input. The information management unit 12 causes the display control unit 18 to generate display data by using the latest data. The display device 5 displays the display data generated by using the latest data.

The abnormal condition data to be selected includes the abnormal condition data satisfying a priority display standard. The abnormal condition data satisfying the priority display standard includes the abnormal condition data having a high risk and the abnormal condition data having high importance. The information management unit 12 causes the display control unit 18 to generate display data by using the abnormal condition data satisfying the priority display standard. The display device 5 displays the display data generated by using the abnormal condition data satisfying the priority display standard.

The abnormal condition data satisfying the priority display standard includes, for example, plant data having been changed at a change rate exceeding a reference value set in advance in the plant 1. The plant data includes, for example, fuel temperature data indicating a fuel temperature having been changed at a change rate exceeding a reference value set in advance, reactor temperature data indicating the temperature in the reactor having been changed at a change rate exceeding a reference value, and reactor pressure data indicating the pressure in the reactor having been changed at a change rate exceeding a reference value. The display device 5 displays display data generated based on the plant data including the fuel temperature data, the reactor temperature data, and the reactor pressure data.

The abnormal condition data satisfying the priority display standard includes peripheral data (weather data and the like) having been changed at a change rate exceeding a reference value set in advance. The peripheral data includes, for example, rainfall amount data indicating a rainfall amount having been changed at a change rate exceeding a reference value set in advance, wind speed data indicating a wind speed having been changed at a change rate exceeding a reference value, and seismic intensity data indicating the intensity of an earthquake having been changed at a change rate exceeding a reference value. The display device 5 displays display data generated based on the peripheral data including the rainfall amount data, the wind speed data, and the seismic intensity data.

The abnormal condition data satisfying the priority display standard can include data supplied from an organization (for example, the government) designated in advance.

When the information management unit 12 causes the display device 5 to display the display data generated based on the abnormal condition data satisfying the priority display standard, the information management unit 12 can highlight the display data based on the priority (the importance degree). As described above with reference to FIG. 5, highlighting includes, for example, pop-up display in which display data is pop-up displayed.

The information management unit 12 can cause the display control unit 18 to generate display data organized for each item of the measures based on the abnormal condition data required for decision making. The display device 5 displays the organized display data. The items of the measures include the following items.
(1) Evacuation timing
(2) Evacuation route
(3) Evacuation site
(4) Work procedure
(5) Personnel distribution
(6) Worker's route
(7) Power source route
(8) Type and number of goods to be transported The database unit 190 stores therein a plurality of pieces of abnormal condition data. The information management unit 12 selects the abnormal condition data required for deciding the items of the respective measures, among the pieces of abnormal condition data stored in the database unit 190, and generates display data by using the selected abnormal condition data. The display device 5 displays the display data.

The abnormal condition data to be selected includes estimation data generated by estimating and calculating a chronological change of the abnormal condition data. The simulation unit 17 estimates and calculates the chronological change of the plant data collected by the information management unit 12 to generate plant estimation data. The information management unit 12 causes the display control unit 18 to generate display data by using the plant estimation data generated by the simulation unit 17. The display device 5 displays the display data.

If a severe accident occurs in the plant 1, the information management unit 12 acquires the required plant data (abnormal condition data) from the plant system 31. The information management unit 12 acquires the required peripheral data (abnormal condition data) from the sub-system 33. The information management unit 12 also acquires various kinds of abnormal condition data via the network 70.

The information management unit 12 causes the display control unit 18 to generate display data based on the acquired abnormal condition data. The information management unit 12 can cause the display control unit 18 to generate the display data by processing the information input from the input device 20. The display device 5 displays the generated display data.

In the present embodiment, the decision-making support system 100 includes the work planning system 10 described in the above embodiment. The abnormal condition data includes work data associated with importance degree data. Accordingly, data related to works in the plant 1 can be shared by the parties concerned.

As described above, according to the present embodiment, the decision-making support system 100 includes the work planning system 10 and the information management unit 12 that shares the abnormal condition data required in case of abnormal conditions via the network 70. The abnormality condition data includes work data associated with the importance degree data. Accordingly, because the abnormal condition data including the work data is shared by the parties concerned, decision making can be effectively supported by using the abnormal condition data.

In the above embodiments, it is assumed that the decision-making support system 100 is applied to a nuclear power generation plant. The decision-making support system 100 can be also applied to at least one of a thermal power generation plant, a chemical plant, and an environmental plant.

The decision-making support system 100 can be applied not only to a disaster of the plant 1, but also to disasters occurring in an urban area due to a natural phenomenon such as an earthquake, a typhoon, and a tsunami. The decision-making support system 100 can be also applied to disasters such as an airplane crash, and a missile attack.

In the above embodiments, it is assumed that the decision-making support system 100 is used at the time of occurrence of an actual accident or a disaster. The decision-making support system 100 can be applied to a training performed in the plant 1 to prepare for an accident or a disaster. The decision-making support system 100 can be applied to a training performed by the government or a local government to prepare for an accident or a disaster.

That is, in the above embodiments, a case of emergency or a case of abnormal conditions is a concept including the cases of an abnormal operation of the plant 1, occurrence of an accident, occurrence of a disaster, and a training assuming occurrence of an accident or a disaster.

Third Embodiment

A third embodiment is described. In the following descriptions, constituent elements like or equivalent to those in the above embodiments are denoted by like reference signs and descriptions thereof will be simplified or omitted.

In the above embodiments, it is assumed that the decision-making support system 100 including the work planning system 10 is applied to plant facilities. The decision-making support system 100 can be applied not only to plant facilities, but also to various applicable targets, for example, traffic facilities such as motorways or railways, or building facilities such as condominium buildings or commercial facilities.

An example in which the work planning system 10 is applied to traffic facilities including motorways is described below.

When various events occur at traffic facilities due to occurrence of an abnormality, the work planning system 10 plans a work to be performed based on the measures decided against these events.

A collapse on a road surface of a motorway, an accident on a motorway, a failure of traffic lights, and a breakage of guardrails are exemplified as the abnormality of traffic facilities.

The contents of works that can be performed with respect to traffic facilities where an abnormality has occurred are finite. A plurality of kinds of contents exist as the contents of works to be performed with respect to traffic facilities. Work data indicating the contents of works that can be performed with respect to traffic facilities are determined in advance.

As described with reference to FIG. 6, the work planning system 10 includes the event-data acquisition unit 81. Event data indicating an event of traffic facilities is acquired by the event-data acquisition unit 81. The decision unit 13 decides each importance degree of a plurality of pieces of work data based on the acquired event data. The display control unit 18 causes the display device 5 to display the plurality of pieces of work data while they are associated with an importance degree. Further, the progress-data acquisition unit 82 acquires progress data indicating each progress status of a plurality of works, and the work-status-data acquisition unit 83 acquires work status data indicating whether each of the plurality of works is being performed normally.

Next, an example of the work planning method according to the present embodiment is described. In the following descriptions, as an example, a work planning method in a case where an accident due to a fallen object has occurred on a motorway.

When an accident occurs on a motorway, various events occur on the motorway. For example, events such as an event where a vehicle fire occurs, an event where roads or traffic lights are damaged, and an event where a traffic congestion occurs occur. The event-data acquisition unit 81 acquires event data indicating an event on a motorway.

The decision unit 13 extracts from the storage unit 15, based on the event data acquired by the event-data acquisition unit 81, work data indicating the contents of works supposed to be performed for measures against the corresponding event. Further, the decision unit 13 decides each importance degree of a plurality of extracted pieces of work data based on the event data. The display control unit 18 causes the display device 5 to display a plurality of pieces of work data while associating them with respective importance degrees.

Figure 12:
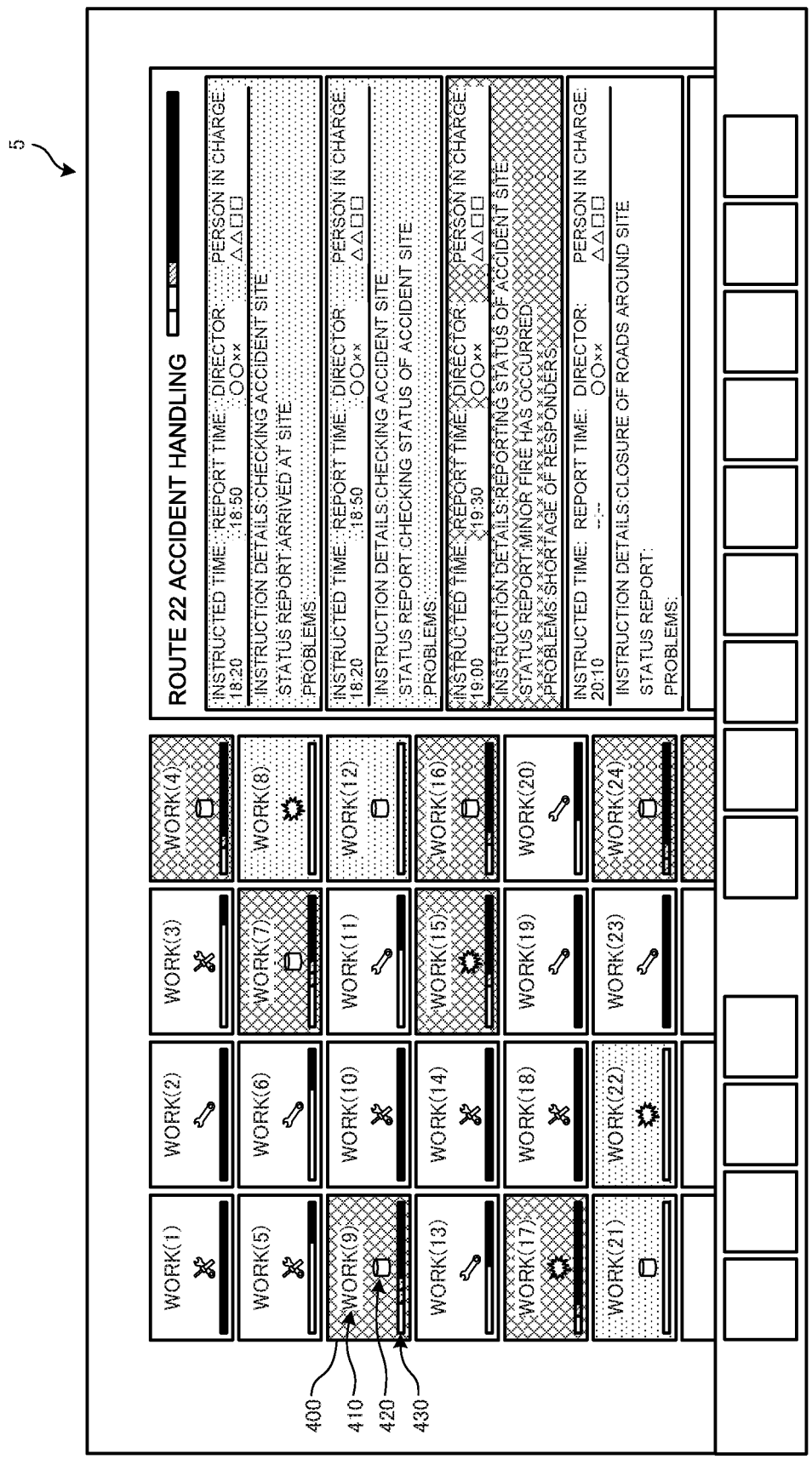
FIG. 12 is a diagram illustrating an example of a display device according to a third embodiment.

FIG. 12 is a diagram illustrating an example of the display device 5 according to the present embodiment. As illustrated in FIG. 12, the display device 5 displays a plurality of icons (tiles) 400 in a left area of the main screen 5A. The icon 400 includes work data 410 indicating the contents of works, importance degree data 420 indicating the importance degree of works, and work progress data 430.

In the example illustrated in FIG. 12, the display device 5 displays 24 icons 400 respectively including the work data 410 indicating the contents of 24 kinds of works (a work (1) to a work (24)). As the contents of the works, for example, "calling an ambulance", "calling out temporary workers", "handling fallen objects", and "announcement of accident information" are exemplified.

In the example illustrated in FIG. 12, three stages of importance degree of works are set. In the example illustrated in FIG. 12, the display device 5 displays a plurality of pieces of work data 410 while associating them with the importance degree data 420 by mutually differentiating the colors of the icons 400.

In the example illustrated in FIG. 12, the progress data 430 is displayed with a bar. As illustrated in FIG. 12, the display device 5 displays the work data 410 and the importance degree data 420 while associating them with the work progress data 430.

The display device 5 displays detailed data of one work among a plurality of works in the right area of the main screen 5A. In the example illustrated in FIG. 12, detailed data of the work (4) is displayed. Data indicating an instructed time of the work (4), a reported time when a worker reported, a director, a person in charge, instruction details, a status report, and the like is displayed.

As described above, according to the present embodiment, each importance degree of a plurality of pieces of work data is decided based on the event data indicating an event of traffic facilities, and the plurality of pieces of work data are displayed while they are associated with importance degree data indicating the importance of each work. Therefore, based on the displayed result, it is possible to appropriately plan the works of measures against the event of the traffic facilities. A worker (a manager) can appropriately plan works by recognizing the displayed part on the display device 5 in which work data and importance degree data are associated with each other.

The abnormal condition data satisfying the priority display standard as described in the second embodiment includes facility data having been changed at a change rate exceeding a reference value set in advance in, for example, traffic facilities or oil/gas facilities. Regarding the traffic facilities, the facility data includes, for example, the rainfall data indicating the rainfall amount having been changed at a change rate exceeding a reference value set in advance, the wind speed data indicating a wind speed having been changed at a change rate exceeding a reference value, the river water level data indicating a water level of a river having been changed at a change rate exceeding a reference value, and the snow accumulation data indicating an accumulation amount of snow having been changed at a change rate exceeding a reference value. Regarding the oil/gas facilities, the facility data includes, for example, temperature data indicating the temperature of the facility having been changed at a change rate exceeding a reference value, and pressure data indicating a facility pressure having been changed at a change rate exceeding a reference value. The display device 5 displays the display data generated based on these pieces of data.

The processes in the work planning system 10 described in the above embodiments can be realized by a computer program to be executed by a computer. For example, it is possible to configure that a computer program provided from a server and the like is installed in the computer system 4 described above, and the computer system 4 performs the processes described above in accordance with the computer program.

Figure 13:
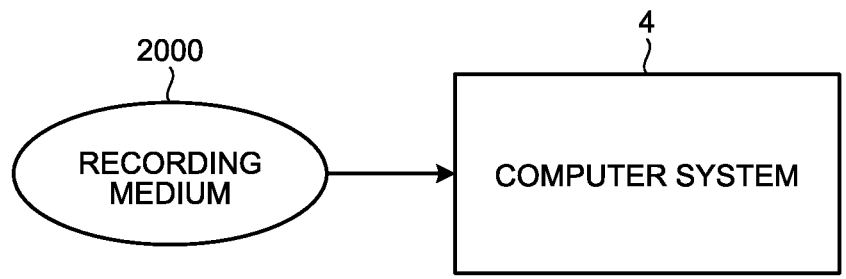
FIG. 13 is a diagram illustrating a recording medium according to the present embodiment.

Further, as illustrated in FIG. 13, it is possible to configure that a computer program is recorded in a recording medium 2000, and the computer system 4 is caused to read the computer program therein to realize the processes described above. As the recording medium 2000, various types of media can be used, such as a recording medium that records therein information optically, electrically, or magnetically like a CD-ROM, a flexible disk, or a magnetooptical disk, or a semiconductor memory that records therein information electrically like a ROM or a flash memory.

Although some embodiments have been described above, the present invention is not limited to the above embodiments, and various modifications and changes can be made within the scope of the claims.

REFERENCE SIGNS LIST 1 plant
2 construction
2A first construction
2B second construction
3 existing device
3A existing pump
3B existing power source
4 computer system
5 display device
5A main screen
5B, 5Ba, 5Bb sub-screen
5S audio output device
6 transportable device
6A transportable pump
6B transportable power source
7, 7A, 7B vehicle
8 device vehicle
8A pump vehicle
8B power source vehicle
9 mobile terminal
10 work planning system
11 interface unit
12 information management unit
13 decision unit
14 estimation unit
15 storage unit
17 simulation unit
18 display control unit
19 database unit
20 input device
21 communication device
22 position detection device
23 monitoring camera
31 plant system
32 emergency-operation-parameter transfer system
33 sub-system
40, 40A, 40B, 40C icon
41 work data
42 priority data
43 progress data
60 synchronization management unit
70 network
100, 100A, 100B, 100C, 100D, 100E decision-making support system
190 database unit
1000 management system
2000 recording medium

The invention claimed is:

1. A computing device comprising a display screen, the computing device being configured to display on the screen:
event data indicating an event of a nuclear power plant;
scenario data comprising:
    a plurality of predicted events of the nuclear power plant determined based on the event data, and
    a probability of occurrence of each predicted event of the plurality of predicted events;
a plurality of pieces of work data indicating contents of works that can be performed with respect to the nuclear power plant;
importance degree for at least one of the plurality of pieces of work data, the importance degree determined by the event data and the probability of occurrence of each of the plurality of predicted events;
at least one sub-screen configured to display at least one of the event data, the plurality of pieces of work data, or the importance degree via images, numerical values, or text; and
at least one icon comprising a piece of work data of the plurality of pieces of work data, the importance degree, and progress data indicating progress of the work data,
wherein:
the plurality of predicted events includes
    a first predicted event indicating a highest probability of occurrence,
    a second predicted event indicating a case that a work has been performed for the first predicted event, and
    a third predicted event indicating another case that the work has not been performed for the first predicted event,
the event data comprises damage data indicating a damage status of the nuclear power plant,
in response to activating the at least one sub-screen, data displayed in the sub-screen is moved to a region of the display screen other than the sub-screen,
work status data associated with the work data, importance degree data, and progress data are displayed in a 2-axis system on a separate display, a first axis of the 2-axis system represents progress data and a second axis of the 2-axis system represents importance degree data, and the computing device is further configured to display at least one of the plurality of the predicted events as the event data.

2. The computing device according to claim 1, wherein the scenario data is estimated from a chronological change of the nuclear power plant.

3. The computing device according to claim 1, further comprising a display control unit that causes a display device to display the plurality of pieces of work data while associating these pieces of work data with importance degree data indicating the importance degree.

4. The computing device according to claim 1, further comprising a progress-data acquisition unit that acquires progress data indicating each progress status of the plurality of works, wherein a display control unit causes a display device to display the work data and the importance degree data while associating these pieces of data with the progress data.

5. The computing device according to claim 4, further comprising an estimation unit that estimates a scheduled end time of the work based on the progress data, wherein the display control unit causes the display device to display time data indicating the scheduled end time.

6. The computing device according to claim 1, further comprising a work-status-data acquisition unit that acquires work status data indicating whether each of the plurality of works is being performed normally, wherein a display control unit causes a display device to display work data of a work being performed normally and work data of a work not being performed normally with a mutually different design.

7. The computing device according to claim 1, wherein the event data further comprises at least one of a damage status of a nuclear reactor system of the nuclear power plant or a damage status of a turbine system of the nuclear power plant caused by the event.

8. A method comprising:
displaying on a screen:
  event data indicating an event of a nuclear power plant;
  scenario data comprising:
    a plurality of predicted events of the nuclear power plant determined based on the event data, and
    a probability of occurrence of each predicted event of the plurality of predicted events;
  a plurality of pieces of work data indicating contents of works that can be performed with respect to the nuclear power plant;
  importance degree for at least one of the plurality of pieces of work data, the importance degree determined by the event data and the probability of occurrence of each of the plurality of predicted events;
  at least one sub-screen configured to display at least one of the event data, the plurality of pieces of work data, or the importance degree via images, numerical values, or text; and
  at least one icon comprising a piece of work data of the plurality of pieces of work data, the importance degree, and progress data indicating progress of the work data; and
displaying at least one of the plurality of the predicted events as the event data,
wherein:
the plurality of predicted events includes
  a first predicted event indicating a highest probability of occurrence,
  a second predicted event indicating a case that a work has been performed for the first predicted event, and
  a third predicted event indicating another case that the work has not been performed for the first predicted event,
the importance degree determines the order in which works are performed,
in response to activating the at least one sub-screen, data displayed in the sub-screen is moved to a region of the display screen other than the sub-screen,
work status data associated with the work data, importance degree data, and progress data are displayed in a 2-axis system on a separate display, and
a first axis of the 2-axis system represents progress data and a second axis of the 2-axis system represents importance degree data.

9. A non-transitory computer-readable medium having recorded thereon a computer program, that when executed, causes a computer to execute:
displaying on a screen:
  event data indicating an event of a nuclear power plant;
  scenario data comprising:
    a plurality of predicted events of the nuclear power plant-determined based on the event data, and
    a probability of occurrence of each predicted event of the plurality of predicted events;
  a plurality of pieces of work data indicating contents of works that can be performed with respect to the nuclear power plant;
  importance degree for at least one of the plurality of pieces of work data, the importance degree determined by the event data and the probability of occurrence of each of the plurality of predicted events;
  at least one sub-screen configured to display at least one of the event data, the plurality of pieces of work data, or the importance degree via images, numerical values, or text; and
  at least one icon comprising a piece of work data of the plurality of pieces of work data, the importance degree, and progress data indicating progress of the work data; and
displaying at least one of the plurality of the predicted events as the event data,
wherein:
the plurality of predicted events includes
  a first predicted event indicating a highest probability of occurrence,
  a second predicted event indicating a case that a work has been performed for the first predicted event, and
  a third predicted event indicating another case that the work has not been performed for the first predicted event,
the importance degree determines the order in which works are performed,
in response to activating the at least one sub-screen, data displayed in the sub-screen is moved to a region of the display screen other than the sub-screen,
work status data associated with the work data, importance degree data, and progress data are displayed in a 2-axis system on a separate display, and
a first axis of the 2-axis system represents progress data and a second axis of the 2-axis system represents importance degree data.

* * * * *